United States Patent
Tanaka et al.

(10) Patent No.: US 8,822,029 B2
(45) Date of Patent: *Sep. 2, 2014

(54) POLYACRYLONITRILE POLYMER, METHOD OF PRODUCING THE SAME, METHOD OF PRODUCING PRECURSOR FIBER USED FOR PRODUCING CARBON FIBER, CARBON FIBER AND METHOD OF PRODUCING THE SAME

(75) Inventors: Fumihiko Tanaka, Ehime (JP); Makoto Endo, Ehime (JP); Yuuki Okishima, Ehime (JP)

(73) Assignee: Toray Industries, Inc. (JP)

( * ) Notice: Subject to any disclaimer, the term of this patent is extended or adjusted under 35 U.S.C. 154(b) by 597 days.

This patent is subject to a terminal disclaimer.

(21) Appl. No.: 12/445,116

(22) PCT Filed: Oct. 15, 2007

(86) PCT No.: PCT/JP2007/070051
§ 371 (c)(1), (2), (4) Date: May 19, 2009

(87) PCT Pub. No.: WO2008/047745
PCT Pub. Date: Apr. 24, 2008

(65) Prior Publication Data
US 2010/0003515 A1    Jan. 7, 2010

(30) Foreign Application Priority Data

Oct. 18, 2006  (JP) .................. 2006-283652
Mar. 7, 2007   (JP) .................. 2007-056829

(51) Int. Cl.
| | | |
|---|---|---|
| C08F 120/44 | (2006.01) |
| D01F 9/12 | (2006.01) |
| D02G 3/02 | (2006.01) |
| D01F 6/18 | (2006.01) |
| D01F 9/22 | (2006.01) |
| D01F 6/54 | (2006.01) |
| C08F 20/44 | (2006.01) |

(52) U.S. Cl.
CPC .. D01F 6/18 (2013.01); D01F 9/22 (2013.01); D01F 6/54 (2013.01); C08F 20/44 (2013.01)
USPC .......................... 428/367; 526/341; 264/29.2

(58) Field of Classification Search
USPC ........................... 423/447.1, 447.2
See application file for complete search history.

(56) References Cited

U.S. PATENT DOCUMENTS

| | | | |
|---|---|---|---|
| 4,658,004 A | 4/1987 | Kobashi et al. |
| 5,269,984 A * | 12/1993 | Ono et al. | 264/29.2 |
| 5,348,802 A | 9/1994 | Matsuhisa et al. |
| 2004/0127647 A1 | 7/2004 | Ong et al. |
| 2007/0142564 A1 | 6/2007 | Reif et al. |

FOREIGN PATENT DOCUMENTS

| | | |
|---|---|---|
| CN | 1417393 A | 5/2003 |
| CN | 1705710 A | 12/2005 |
| EP | 1 801 126 A2 | 6/2007 |
| EP | 1 921 183 A1 | 5/2008 |
| EP | 1 961 847 A1 | 8/2008 |
| JP | 58-186614 | 10/1983 |
| JP | 59-021709 A | 2/1984 |
| JP | 61-014206 A | 1/1986 |
| JP | 61-097415 A | 5/1986 |
| JP | 62-257422 | 11/1987 |
| JP | 63-123403 A | 5/1988 |
| JP | 63-182317 A | 7/1988 |
| JP | 63-275717 | 11/1988 |
| JP | 64-077618 A | 3/1989 |
| JP | 3-180514 A | 8/1991 |
| JP | 3-185121 A | 8/1991 |
| JP | 3-210309 A | 9/1991 |
| JP | 4-222229 | 8/1992 |
| JP | 9-170170 | 6/1997 |
| JP | 11-107034 | 4/1999 |
| JP | 2002-161114 | 6/2002 |
| JP | 2002-266173 | 9/2002 |
| JP | 2002-371437 | 12/2002 |
| JP | 2002-371438 | 12/2002 |
| JP | 2004-091961 A | 3/2004 |
| JP | 2004-197278 A | 7/2004 |
| JP | 2007-269822 | 10/2008 |
| WO | 2004/035679 A1 | 4/2004 |
| WO | 2008047745 | 4/2008 |

OTHER PUBLICATIONS

Akinari Minegishi et al., "The effect of ultrahigh molecular weight polymers on the nonlinear response in uniaxial elongational viscosity," *Journal of the Society of Rheology*, vol. 25, No. 4 (1997), pp. 215-216.

* cited by examiner

*Primary Examiner* — Yun Qian
(74) *Attorney, Agent, or Firm* — DLA Piper LLP (US)

(57) ABSTRACT

A polyacrylonitrile-based polymer which satisfies at least one of [a] to [d]:
[a] Z-average molecular weight (Mz) determined by gel-permeation chromatograph is 800,000 to 6,000,000 and degree of polydispersity (Mz/Mw) (Mw denotes weight average molecular weight) is 3.0 to 10.0;
[b] Z+1-average molecular weight (Mz+1) determined by GPC method is 3,000,000 to 10,000,000 and degree of polydispersity (Mz+1/Mw) is 6.0 to 25.0;
[c] Mzm determined by gel-permeation chromatograph multi-angle laserlight scattering photometry is 400,000 to 1,000,000 and degree of polydispersity (Mzm/Mwm) is 3.0 to 10.0; and
[d] Z-average radius of gyration (Rz) determined by gel-permeation chromatograph multi-angle laserlight scattering photometry is 25 to 45 nm and its ratio to weight average radius of gyration (Rz/Rw) is 1.3 to 2.5.

8 Claims, No Drawings

POLYACRYLONITRILE POLYMER, METHOD OF PRODUCING THE SAME, METHOD OF PRODUCING PRECURSOR FIBER USED FOR PRODUCING CARBON FIBER, CARBON FIBER AND METHOD OF PRODUCING THE SAME

RELATED APPLICATIONS

This is a §371 of International Application No. PCT/JP2007/070051, with an international filing date of Oct. 15, 2007 (WO 2008/047745 A1, published Apr. 24, 2008), which is based on Japanese Patent Application Nos. 2006-283652, filed Oct. 18, 2006, and 2007-056829, filed Mar. 7, 2007.

TECHNICAL FIELD

This disclosure relates to a polyacrylonitrile-based polymer suitable for producing a high grade precursor fiber of carbon fiber and a carbon fiber, and a production method thereof, and a production method of the precursor fiber of carbon fiber and the carbon fiber in which the polyacrylonitrile-based polymer solution is used. Furthermore, the disclosure relates to a carbon fiber excellent in compressive strength and tensile modulus and a production method thereof.

BACKGROUND

Since carbon fiber has a high specific strength and specific modulus compared to other fibers, as a reinforcing fiber for composite materials, in addition to conventional sporting good applications or aerospace applications, it has also been widely applied to general industrial uses such as for automobile, civil engineering and architecture, compressed container and wind turbine blade, and further improvement in productivity and production stability are highly demanded.

Among the carbon fibers, polyacrylonitrile (hereafter, may be abbreviated as PAN)-based carbon fiber, which is most widely used, is industrially produced by subjecting a spinning solution composed of a PAN-based polymer, which is precursor of the fiber, to a wet spinning, a dry spinning or a dry-wet spinning to obtain a precursor fiber of carbon fiber, and then it is converted to a stabilized fiber by heating at a temperature of 200 to 400° C. under an oxidizing atmosphere and carbonized at a temperature of at least 1,000° C. under an inert atmosphere.

The improvement of productivity of the PAN-based carbon fiber has been tried in any view point of spinning, stabilization and carbonization of the precursor fiber of carbon fiber. Among them, the improvement of productivity of the PAN-based precursor fiber of carbon fiber was difficult from the following problems. That is, in the spinning for obtaining the PAN-based precursor fiber of carbon fiber, its productivity is limited by a critical draft ratio at spinning accompanied by characteristics of the PAN-based polymer solution and a critical draw ratio accompanied by its coagulation structure, and when spinning speed is increased to improve productivity, drawability decreases to cause an unstable production, and when spinning speed is decreased, although production is stabilized, productivity decreases, and accordingly, there was a problem that an improvement of productivity and a stabilization were hard to be compatible.

There is spinning method as a factor which greatly affects the critical draft ratio at spinning, and accordingly, the critical draft ratio is explained in view of the spinning method. The dry spinning method is a method in which a spinning solution is extruded from spinneret holes in a high temperature gas atmosphere and the solvent is evaporated to concentrate and solidify, and since its taking up speed is bound by the evaporation speed of the solvent, there are defects such as that a very long spinning cylinder becomes necessary accompanied by an increase of the taking up speed.

On the other hand, the wet spinning method is a method in which a spinning solution is extruded from spinneret holes in a coagulation bath, but since the coagulation is started from just after the spinning solution is extruded from the spinneret holds, although a substantial draft ratio at spinning increases depending on increasing of the taking up speed, there is a problem that a fiber breakage occurs at spinneret surface, and accordingly, there is a limit to make the taking up speed high.

Furthermore, in the dry-wet spinning method, since a spinning solution is once extruded in the air (air gap) and then introduced into a coagulation bath, and since the substantial draft ratio at spinning is absorbed in the original liquid flow in the air gap to enable a high speed spinning, several proposals have been made so far. For example, a technique of improving taking up speed by reducing resistance of the coagulation bath by using a flow-down type coagulation bath (JP-S59-21709 A)) is proposed. However, in this proposal, although taking up speed can be greatly improved, (1) since a spinneret of a specified shape is used, a precursor fiber of a fine single fiber thickness cannot be obtained, (2) the structure of coagulation bath is complicated and it not a technique capable of realizing industrially, and (3) because of a relation between a slit of flow-down cylinder outlet and a thickness of fiber bundle to be passed, there was a problem such as that its operation or production stability is impaired.

Furthermore, a technique is proposed in which, by controlling polymer concentration of the spinning solution, spinning solution viscosity is decreased to improve handling at filtering operation, to improve the draft ratio at spinning (JP-S64-77618 A). However, according to this proposal, although an improvement effect is found as that the draft ratio at spinning is 10, (1) it is not economical since the polymer concentration is low and an amount of solvent used is large, and (2) there are problems that coagulation speed in the coagulation bath decreases and voids are generated inside and a dense structure cannot be obtained.

In general, it is known that an increase of viscosity during a large extensional deformation in a melt-molding such as melt-spinning is advantageous to prevent an unstable flow. As one technique for that, a method of adding a small amount of an ultra-high molecular weight polymer is mentioned (Journal of the Society of Rheology, Japan, P215, No. 25 (1997)). In the case where such a polymer is used as a polymer for melt-spinning, it is known that spinnability is improved. However, application of this technique to a solution spinning which is an ordinary spinning method for PAN-based polymer has almost not been tried.

Mixing 2 kinds of polymer of PAN-based polymer different in molecular weight distribution means to make molecular weight distribution wide (broad). As method for controlling the molecular weight distribution, several proposals have been made so far. For example, a method is proposed to obtain a high strength and high modulus PAN-based fiber by using a polymer of which molecular weight distribution is narrowed as a weight average molecular weight (hereafter, may be abbreviated as Mw) is 400,000 or more and a molecular weight distribution (Mw/Mn) which is the ratio of Mw to number average molecular weight (hereafter, may be abbreviated as Mn) is 7.0 or less (JP-S61-97415 A). As represented by this proposal, conventionally, it has been proposed that a narrowing molecular weight distribution is preferable for the precursor fiber of carbon fiber.

In particular, in aircraft applications, a carbon fiber of which compressive strength and tensile modulus are compatible in a high level is demanded. In carbon fibers, as the highest temperature in carbonization step becomes higher, the tensile modulus of the obtained carbon fiber can be made higher, but accompanied by a growth of carbon net planes, compressive strength of the obtained carbon fiber decreases. That is, the relation between tensile modulus and compressive strength of carbon fiber is in a trade-off relation. To make the compressive strength and tensile modulus in this trade-off relation compatible, other than controlling the carbonization temperature, regarding techniques for increasing the compressive strength and tensile-modulus, several proposals have been made so far.

As techniques for improving the compressive strength of carbon fiber, for example, techniques are proposed in which carbon fiber is subjected to an ion implantation to decrystallize graphite crystal, or cross-sectional shape of precursor fiber to be used is made into non-circular, to increase geometrical moment of inertia (JP-H3-180514 A and JP-H3-185121 A). However, in the former proposal, carbon fiber can be treated only by little by little at a high vacuum, and in the latter proposal, it is difficult to maintain a stable cross-sectional shape and there is a problem in uniformity of final product, and both proposals are difficult to be applied industrially.

It is known that, to improve tensile modulus of carbon fiber, an increase of degree of orientation of the carbon fiber to be obtained by drawing the fiber at stabilization-carbonization is effective. However, only by the increase of draw ratio, a generation of fuzz or fiber breakage is induced, and lowering of production stability or lowering of grade of the carbon fiber to be obtained is unavoidable. A technique of improving stabilization of drawing by controlling stabilization-carbonization conditions is also proposed (JP-2004-91961 A and JP-2004-197278 A). However, it cannot be said that the level of drawing is high, and the improvement effect of tensile modulus by the drawing is small.

It could therefore be helpful to provide a polyacrylonitrile-based polymer suitable for producing a precursor fiber of carbon fiber capable of increasing spinning speed, and in addition, capable of increasing draft ratio at spinning, and a production method thereof. It could be helpful, by using the polyacrylonitrile-based polymer solution, to provide a method for producing a high grade precursor fiber of carbon fiber with little fuzz, without spoiling productivity. It could further be helpful to provide a method capable of stably producing also in a stabilization-carbonization step, a high grade carbon fiber in which the above-mentioned high grade precursor fiber of carbon fiber is used. It could still further be helpful to provide a carbon fiber excellent in both of compressive strength and tensile modulus and a production method thereof without spoiling productivity and processability.

SUMMARY

We thus provide a polyacrylonitrile-based polymer, containing a polymer of which main component is acrylonitrile, which satisfies at least one kind requirement selected from the following [a] to [d]:

[a] A Z-average molecular weight (Mz) determined by gel-permeation chromatograph (GPC) is 800,000 to 6,000,000 and a degree of polydispersity (Mz/Mw) (Mw denotes weight average molecular weight) is 3.0 to 100.

[b] A Z+1-average molecular weight (Mz+1) determined by GPC method is 3,000,000 to 10,000,000 and a degree of polydispersity (Mz+1/Mw) is 6.0 to 25.0.

[c] An Mzm determined by gel-permeation chromatograph [space]multi-angle laser-light scattering photometry (GPC-MALLS) is 400,000 to 1,000,000 and a degree of polydispersity (Mzm/Mwm) is 3.0 to 10.0.

[d] A Z-average radius of gyration (Rz) determined by gel-permeation chromatograph[space]multi-angle laserlight scattering photometry (GPC-MALLS) is 25 to 45 nm and a ratio to weight average radius of gyration (Rz/Rw) is 1.3 to 2.5.

The PAN-based polymer is defined as a polymer composition containing a polymer of which composition 70 mol % or more is acrylonitrile, and can contain wt % or less of other polymer.

According to a preferable aspect of the polyacrylonitrile-based polymer, a content of a component of which molecular-weight determined by GPC method is 3,000,000 or more is 1 to 10%.

According to a preferable aspect of the polyacrylonitrile-based polymer, a polyacrylonitrile-based polymer (A component) of which weight-average molecular weight (Mw) determined by GPC method is 1,000,000 to 15,000,000 and a polyacrylonitrile-based polymer (B component) of which weight average molecular weight (Mw) is 150,000 to 1,000,000 are contained in a weight average molecular weight ratio of A component to the B component is 2 to 45, and in addition, in a ratio of A component/B component (weight ratio)=0.001 to 0.3.

According to a preferable aspect of the polyacrylonitrile-based polymer, a ratio of weight average molecular weight of the above-mentioned. A component to the above-mentioned B component is 4 to 45.

The polyacrylonitrile-based polymer is suitable for producing a precursor fiber of carbon fiber.

In the production method of the polyacrylonitrile-based polymer, after adjusting polymer concentration of the above-mentioned A component to solvent into 0.1 to 5 wt %, the B component is mixed with it, or a monomer constituting the B component is mixed with it and the monomer is polymerized.

According to a preferable aspect of the production method of the polyacrylonitrile-based polymer, after preparing the above-mentioned A component and before start of mixing the B component, polymer concentration of the A component to solvent is controlled to 5 wt % or less, and the B component is mixed with it, or after preparing the A component and before start of polymerization of the monomer constituting the B component, polymer concentration of the A component to solvent is controlled to 5 wt % or less, and the monomer constituting B component is mixed with it and the monomer is polymerized.

According to a preferable aspect of the production method of the polyacrylonitrile-based polymer, it is a production method including a step of introducing a polymerization initiator in a liquid containing a monomer of which main component is acrylonitrile and a step of additionally introducing a polymerization initiator separately to polymerize residual unreacted monomer before the end of polymerization, and the ratio of an amount weighed and introduced of the polymerization initiator at the first time to the other amount weighed and introduced (amount weighed and introduced at the first time/amount weighed and introduced at the other time) is set to 0.0001 or more and 0.1 or less.

The polyacrylonitrile-based polymer solution contains the above-mentioned polyacrylonitrile-based polymer.

According to a preferable aspect of the polyacrylonitrile-based polymer solution, it is a polyacrylonitrile-based polymer solution of which elongational viscosity which is mentioned later is 10,000 Pa·s or more.

According to a preferable aspect of the polyacrylonitrile-based polymer solution, it is a polyacrylonitrile-based polymer solution of which ratio of storage modulus at a frequency determined by dynamic viscoelasticity of 50 rad/s to storage modulus at a frequency of 0.05 rad/s is 5 to 500.

According to a preferable aspect of the polyacrylonitrile-based polymer solution, it is a polyacrylonitrile-based polymer solution of which ratio of viscosity at a shear rate measured by cone-plate viscometer of 20 $s^{-1}$ viscosity at a shear rate is 2,000 $s^{-1}$ is 10 to 50.

The production method of precursor fiber of carbon fiber is a production method of precursor fiber of carbon fiber in which the polyacrylonitrile-based polymer solution which is suitable for producing the above-mentioned precursor fiber of carbon fiber is spun by a dry-wet spinning method.

According to a preferable aspect of the production method of precursor fiber of carbon fiber, at the above-mentioned dry-wet spinning, the spun yarn is taken up in a draft ratio at spinning of 12 to 100 times and a draw ratio after taking up is set to 10 to 35 times, or at the dry-wet spinning, the coagulated yarn is taken up at a speed of 50 to 500 m/min, and a draw ratio after taking up is set to 10 to 35 times.

Furthermore, the production method of carbon fiber is a production method of carbon fiber in which a precursor fiber of carbon fiber obtained by the above-mentioned production method of precursor fiber of carbon fiber is, after being stabilized in air at a temperature of 200 to 300° C., pre-carbonized in an inert atmosphere at a temperature of 300 to 800° C., and then carbonized in an inert atmosphere at a temperature of 1,000 to 3,000° C.

According to a preferable aspect of the production method of carbon fiber, it is a production method of carbon fiber in which the precursor fiber is carbonized at a tension of carbonization of 5.9 to 13.0 mN/dtex-precursor fiber.

Furthermore, the carbon fiber is a carbon fiber of which crystallite size (Lc(nm)), tensile modulus of strand (YM (GPa)) and spin density of localized electron (LS(spin/g)) measured by electron spin resonance (may be abbreviated as ESR) satisfies the following equations (1) to (3):

$$2.6 \leq Lc \leq 3.4 \quad (1)$$

$$50Lc+250 < YM \leq 50Lc+320 \quad (2)$$

$$0.5 \times 10^{18} \leq LS < 2.2 \times 10^{18} \quad (3).$$

By using the solution of the PAN-based polymer capable of increasing spinning speed, and in addition, increasing draft ratio at spinning, it possible to produce a high grade precursor fiber of carbon fiber with little fuzz without spoiling productivity. Since such a high grade precursor fiber of carbon fiber is used, it is also possible to stably produce a high grade carbon fiber also at stabilization-carbonization steps. Since the precursor fiber can stably be processed even by a high tension stabilization-carbonization, it is possible to produce a carbon fiber excellent in compressive strength, tensile modulus, and further, tensile strength and appearance, with good productivity and processability.

DETAILED DESCRIPTION

The polyacrylonitrile-based polymer (may be abbreviated as PAN-based polymer) contains a polymer of which main component is acrylonitrile, and satisfies at least one kind requirement selected from the following [a] to [d].

The requirement [a] of PAN-based polymer is that, Z-average molecular weight (hereafter, abbreviated as Mz) determined by gel-permeation chromatograph (hereafter, abbreviated as GPC) (details of measurement are mentioned later) is 800,000 to 6,000,000 and the degree of polydispersity (Mz/Mw) (Mw denotes weight average molecular weight, hereafter, abbreviated as Mw) is 3.0 to 10.0. Mz is preferably 2,000,000 to 6,000,000, more preferably 2,500,000 to 5,000,000 and still more preferably 2,500,000 to 4,000,000. The degree of polydispersity (Mz/Mw) is preferably 5.0 to 8.0 and more preferably 5.5 to 7.0.

Indexes relating to the average molecular weight and molecular weight distribution determined by GPC method are explained in the following.

In the average molecular weights determined by GPC method, there are number average molecular weight (hereafter, abbreviated as Mn), weight average molecular weight (Mw), Z-average molecular weight (Mz) and Z+1-average molecular weight ($M_{Z+1}$). Mn is sensitively affected by low molecular weight substances contained in high molecular weight compounds. On the contrary, Mw more sensitively affected than Mn by high molecular weight substances. Mz is more sensitively affected than Mw by high molecular weight substances and Z+1-average molecular weight (hereafter, abbreviated as $M_{Z+1}$) is more sensitively affected than Mz by high molecular weight substances.

In indexes relating to molecular weight distribution obtainable by average molecular weight determined by GPC method, there are molecular weight distribution (Mw/Mn) and degree of polydispersity (Mz/Mw and $Mz_{Z+1}$/Mw), and, by using these, it is possible to indicate a condition of molecular weight distribution. When molecular weight distribution (Mw/Mn) is 1, it is a single dispersion., and as the molecular weight distribution (Mw/Mn) becomes larger than 1, the molecular weight distribution becomes broader around the low molecular weight side, and as the degree of polydispersity (Mz/Mw) becomes larger than 1, the molecular weight distribution becomes broader around the high molecular weight side. Also, as the degree of polydispersity ($M_{Z+1}$/Mw) becomes larger than 1, the molecular weight distribution becomes broader around the high molecular weight side. In particular, the degree of polydispersity ($M^{Z+1}$/Mw) becomes, in the case where 2 kinds of polymer greatly different in Mw are mixed, significantly large. The molecular weight determined by GPC method is indicated by the molecular weight in terms of polystyrene.

As the above-mentioned, since meanings of the molecular weight distribution (Mw/Mn) and the degree of polydispersity (Mz/Mw) are different, according to our studies, as shown in JP-S61-97415 A, even when a molecular weight distribution (Mw/Mn) is made into 7.0, the degree of polydispersity (Mz/Mw) does not necessarily become 3.0 or more, for example, in JP-S61-97415 A, when confirmed according to the method of the example, it was found that even when a molecular weight distribution (Mw/Mn) Was 7.1, the value of the degree of polydispersity (Mz/Mw) was 1.5 to 2.5, and an improvement of spinnability was not found.

The mechanism for being able to produce the high grade precursor fiber of carbon fiber with little fuzz by using PAN-based polymer, while making improvement of productivity and production stability compatible by subjecting a spinning solution containing such a polymer to a wet spinning, dry spinning or dry-wet spinning to obtain a precursor fiber of carbon fiber, is not necessarily clear, but it is estimated as follows. In a dry spinning or dry-wet spinning, when the PAN-based polymer is extensional deformed between just after spinneret holes and until it is coagulated, an ultra-high molecular weight substance and a high molecular Weight substance of the PAN-based polymer are entangled in the spinning solution to cause a stress between the entangled molecular chains around the ultra-high molecular weight substance, and a rapid increase of elongational viscosity, that is, a strain hardening occurs. The elongational viscosity of thinning portion increases accompanied by the thinning of the PAN-based polymer solution between just after the spinneret holes and until it is coagulated, and stabilize the flow to increase spinning speed, and in addition, it becomes possible to increase draft ratio at spinning. In the spinning solution state, it is possible to spin-up and take up at several 10 m/min even without a coagulation, i.e., an especially notable effect can be obtained that a high spinnability which cannot be expected in a solution spinning can be obtained, and even in a fiber after coagulation by a wet spinning, dry spinning or dry-wet spinning, too, since a similar increase of elongational viscosity occurs to improve drawability, a generation of fuzz is prevented.

For that reason, as the degree of polydispersity (Mz/Mw) is larger, the more preferable it is, and when the Mz is in the range of 800,000 to 6,000,000, a sufficient strain hardening arises at a degree of polydispersity (Mz/Mw) of 3.0 or more and a degree of improvement of extrusion stability of the spinning solution containing PAN-based polymer becomes sufficient. In the case where the degree of polydispersity (Mz/Mw) is too large, since the strain hardening is too strong, the improvement effect of extrusion stability of the spinning solution containing PAN-based polymer decreases in some cases, but when the Mz is in the range of 800,000 to 6,000,000 and the degree of polydispersity (Mz/Mw) is 10.0 or less, a degree of improvement of extrusion stability of the spinning solution containing PAN-based polymer becomes sufficient. In the range of the degree of polydispersity (Mz/Mw) of 3.0 to 10.0, when the Mz is less than 800,000, strength of precursor, fiber is insufficient in some cases, and when the Mz is larger than 6,000,000, an extrusion becomes difficult in some cases.

In a measurement of GPC method, to precisely measure high molecular weight, it is necessary to dilute to an extent that no dependency of eluent time on concentration is found (i.e., viscosity change is small) and to inject as much as possible to obtain a high detection sensitivity, and an elusion rate and a column should be selected to prepare for a broad molecular weight distribution. An exclusion limit molecular weight of the column is at least 10,000,000 or more and should be set such that no tailing of peak is found. In general, a measurement is made by diluting to 0.1 wt/vol % and in 2 kind conditions of amount of injection, 20 μl and 200 μl, and in the case where the 2 data are different, the data of the amount of injection of 200 μl is employed.

The requirement [b] of PAN-based polymer is that the $M_{Z+1}$ determined by GPC method is 3,000,000 to 10,000,000 and the degree of polydispersity ($M_{Z+1}$/Mw) is 6.0 to 25.0. The $M_{Z+1}$ is preferably 4,000,000 to 9,000,000 and more preferably 5,000,000 to 9,000,000. The degree of polydispersity ($M_{Z+1}$/Mw) is preferably 7.0 to 17.0 and more preferably 10.0 to 15.0.

The degree of polydispersity ($M_{Z+1}$/Mw) is more reflected than the degree of polydispersity (Mz/Mw) to high molecular weight substances, and the effect of improvement of productivity at spinning is similar in the requirements [a] and [b], but their molecular weight distributions are not necessarily in the same range. When the $M_{Z+1}$ is in the range of 3,000,000 to 10,000,000 and the degree of polydispersity ($M_{Z+1}$/Mw) is 6.0 or more, a sufficient strain hardening arises and a degree of improvement of extrusion stability of the spinning solution containing PAN-based polymer is sufficient. In the case where the degree of polydispersity ($M_{Z+1}$/Mw) is too large, the strain hardening is too strong and a degree of improvement of extrusion stability of the spinning solution containing PAN-based polymer is insufficient in some cases, but when the $M_{Z+1}$ is in the range of 3,000,000 to 10,000,000 and the degree of polydispersity ($M_{Z+1}$/Mw) is 25.0 or less, an improvement of extrusion stability of the spinning solution containing PAN-based polymer becomes sufficient. In the range of degree of polydispersity ($M_{Z+1}$/Mw) of 6.0 to 25.0 and the $M_{Z+1}$ is less than 3,000,000, strength of the obtained precursor fiber is insufficient in some cases, and when the $M_{Z+1}$ is larger than 10,000,000, it becomes difficult to extrude the spinning solution containing PAN-based polymer from a spinneret in some cases.

The requirement [c] of PAN-based polymer is that an Mzm determined by a gel-permeation chromatograph-multi-angle light scattering photometer (hereafter, abbreviated as GPC-MALLS; details of measurement are mentioned later) is 40,000 to 1,000,000 and the degree of polydispersity (Mzm/Mwm) is 3.0 to 10.0. The Mzm is preferably 600,000 to 800,000. The degree of polydispersity (Mzm/Mwm) of PAN-based polymer is preferably 5.0 to 8.0 and more preferably 5.5 to 7.0. The molecular weight and molecular weight distribution determined by GPC-MALLS is based on absolute molecular weight, and reflect true value than the molecular weight distribution determined by GPC method, and is preferable since error is small, but the determination by GPC is sufficient in most cases. When the Mzm is in the range of 400,000 to 1,000,000 and the degree of polydispersity (Mzm/Mwm) is 3.0 or more, a sufficient strain hardening arises and a degree of improvement of extrusion stability of the PAN-based polymer is sufficient. In the case where the degree of polydispersity (Mzm/Mwm) is too large, the strain hardening is too strong, the degree of improvement of extrusion stability of the spinning solution containing PAN-based polymer is insufficient in some cases, but when the Mzm is in the range of 400,000 to 1,000,000 and when the degree of polydispersity (Mzm/Mwm) is 10.0 or less, an improvement of extrusion stability of the spinning solution containing PAN-based polymer is sufficient. In the range of the degree of polydispersity (Mzm/Mwm) of 3.0 to 10.0 and when the Mzm is less than 400,000, strength of the obtained precursor fiber is insufficient in some cases, and when the Mzm is larger than 1,000,000, an extrusion of the spinning solution containing the PAN-based polymer becomes difficult in some cases.

The requirement [d] of PAN-based polymer is that, a Z-average radius of gyration (hereafter, abbreviated as Rz) determined by GPC-MALLS is 25 to 45 nm and a ratio of Rz to Rw (Rz/Rw) (Rw denotes weight average radius of gyration. Hereafter, abbreviated as Rw) is 1.3 to 2.5. The Rz is preferably 29 to 37 nm.

In the GPC-MALLS, by using the multi-angle light scattering photometer as a detector, rotation radius can be examined. To broaden molecular weight distribution in high molecular weight side is to connect molecules of which rotation radius is small with each other by a molecule of which rotation radius is large, and it is possible not only by an effect of a linear chain molecule, but also by means such as introducing a long chain branch or using a copolymer of which affinity with solvent is changed. For that reason, to control the Rz/Rw can also be one means to improve the extrusion stability. When the Rz is in the range of 25 to 45 nm and the Rz/Rw is 1.3 or more, a sufficient strain hardening arises and a degree of improvement of extrusion stability of the PAN-based polymer becomes sufficient. In the case where the Rz/Rw is too large, there is a molecule of which rotation radius is too large to decrease drawability in fiber production in some cases, but when the Rz is in the range of 25 to 45 nm and the Rz/Rw is 2.5 or less, an improvement of extrusion stability of the spinning solution containing PAN-based polymer is sufficient. When the Rz is in the range of 25 to 45 nm and the Rz is less than 25 nm, strength of the obtained precursor fiber is insufficient in some cases, and when the Rz is larger than 45 nm, an extrusion of the spinning solution containing PAN-based polymer becomes difficult in some cases.

Furthermore, in the case Where PAN-based polymer satisfies the requirement [a] or [c], since as the molecular weight distribution (Mw/Mn) or (Mwm/Mnm) becomes smaller, the content of low molecular weight component which is easy to become a structural defect of carbon fiber becomes smaller, it is preferable to be small, and therefore, it is preferable that the molecular weight distribution (Mw/Mn) or (Mwm/Mnm) is smaller than the degree of polydispersity (Mz/Mw) or (Mzm/Mwm). That is, even when it is broad in high molecular weight side and also in low molecular weight side, a decrease of extrusion stability of the spinning solution containing PAN-based polymer is small, but it is preferable that the low molecular weight side is as sharp as possible (content of low molecular weight component is small), and it is more preferable that the degree of polydispersity (Mz/Mw) of (Mzm/Mwm) is 1.5 times or more of the molecular weight distribution (Mw/Mn) or (Mwm/Mnm), and still more preferably 1.8 times or more. In radical polymerizations usually employed for polymerization of acrylonitrile (AN), such as aqueous suspension or solution polymerization method, since the molecular weight distribution is broad in low molecular weight side, the molecular weight distribution (Mw/Mn) or (Mwm/Mnm) becomes larger than the degree of polydispersity (Mz/Mw) or (Mzm/Mwm). For that reason, to obtain a polymer of which molecular weight distribution (Mw/Mn) or (Mwm/Mnm) is smaller than the degree of polydispersity (Mz/Mw) or (Mzm/Mwm), in a production method for producing PAN-based polymer, which is mentioned later, and in the case where a polymerization is carried out in a specified condition as to kind, content or stepwise addition of polymerization initiator, a more precise adjustment of condition is necessary, that is, a method in which, after a polymerization in such a condition that an effective amount of radical generated is extremely small to acrylonitrile, an ordinary radical polymerization is carried out, or a method in which, by employing ordinary radical polymerization, 2 kinds or more polyacrylonitrile-based polymer are mixed, is necessary. Among them, the method of mixing polymers is simple. As the kinds to be mixed are fewer, the process becomes simpler, and in view of extrusion stability, too, 2 kinds are sufficient in most cases.

Furthermore, in the above-described molecular weight distribution, it is preferable to contain a component of which molecular weight is 3,000,000 or more by 1 to 10%, and it is preferable that the Mw is 100,000 to 600,000. When the component of which molecular weight is 3,000,000 or more is less than 1%, strain hardening is weak and degree of improvement of extrusion stability from spinneret of the spinning solution containing the PAN-based polymer is insufficient in some cases, and in the case where the component of which molecular weight is 3,000,000 or more exceeds 10%, the strain hardening is too strong and degree of improvement of extrusion stability of the PAN-based polymer is insufficient in some cases. From such a view point, it is more preferable that a component of which molecular weight is 3,000,000 or more is contained by 1 to 7%, and to be contained by 1 to 4% is still more preferable. Content of the component of which molecular weight is 3,000,000 or more mentioned here is a value obtainable from a logarithm of molecular weight in terms of polystyrene measured by GPC method and a molecular weight distribution curve drawn by difference of refractive index, and it indicates the ratio occupied by an integrated value of the peak area of the molecular weight in terms of polystyrene of 3,000,000 or more with respect to an integrated value of the whole molecular weight distribution. Since the difference of refractive index corresponds to the weight of molecule eluted in unit time, the integrated value of the peak area approximately corresponds to the mixed ratio in weight.

A polyacrylonitrile-based polymer which satisfies the requirement [a] and/or [b] of PAN-based polymer can be obtained by a method a mixing 2 kinds of polyacrylonitrile-based polymer (written as A component and B component) different in molecular weight (Mw). Whereas, the mixing means to finally obtain a mixture of the A component and the B component, although the concrete mixing method is mentioned later, and not limited to mix the respective single component.

First, 2 kinds of polyacrylonitrile-based polymer to be mixed are explained. When a polyacrylonitrile-based polymer of which Mw is large is referred to as the A component and a polyacrylonitrile-based polymer of which Mw is small is referred to as the B component, the Mw of the A component is preferably 1,000,000 to 15,000,000 and more preferably 1,000,000 to 5,000,000, and it is preferable that the Mw of the B component is 150,000 to 1,000,000. Since as the difference of the Mw of the A component and the B component becomes larger, the degree of polydispersity (Mz/Mw) of the mixed polymer is apt to become larger, and it is preferable, but since when the Mw of the A component is larger than 15,000,000, productivity of the A component may lower and when the Mw of the B component is less than 150,000, strength of precursor fiber may become insufficient, it is preferable that the degree of polydispersity (Mz/Mw) is controlled to 10 or less.

In the polyacrylonitrile-based polymer which satisfies the requirement [a] of PAN-based polymer, concretely, it is preferable that the weight average molecular weight ratio of the A component to the B component is 2 to 45, more preferably 4 to 45 and still more preferably 20 to 45.

In addition, it is preferable that a weight ratio of A component/B component is 0.001 to 0.3, more preferably 0.005 to 0.2 and still more preferably 0.01 to 0.1. When the weight ratio of the A component to the B component is less than 0.001, the strain hardening is insufficient in some cases, and when it is larger than 0.3, extrusion viscosity of the polymer solution becomes too high and an extrusion becomes difficult in some cases.

In the polyacrylonitrile-based polymer which satisfies the requirement [b] of PAN-based polymer, concretely, it is preferable that the weight average molecular weight ratio of the A component to the B component is 1.2 to 30, more preferably 4 to 30 and still more preferably 6 to 15.

In addition, it is preferable that the weight ratio of the A component/B component is 0.001 to 0.3, more preferably 0.005 to 0.2 and still more preferably 0.01 to 0.1. When the weight ratio of the A component to the B component is less than 0.001, the strain hardening is insufficient in some cases, and when it is larger than 0.3, extrusion viscosity of polymer solution becomes too high and an extrusion becomes difficult in some cases.

The Mw and the weight ratio is determined by peak splitting of peaks of molecular weight distribution measured by GPC into shoulders and peak portions, to calculate Mw and area ratio of peak of the respective peaks.

A polyacrylonitrile-based polymer which satisfies the requirement [c] and/or [d] of PAN-based polymer can be obtained by a method of mixing 2 kinds of polyacrylonitrile-based polymer different in molecular weight (Mwm) (written as Am component and Bm component).

First, 2 kinds of polyacrylonitrile-based polymer to be mixed are explained. A polyacrylonitrile-based polymer of which Mwm determined by GPC-MALLS is large is referred to as the Am component and a polyacrylonitrile-based polymer of which Mwm is small is referred to as the Bm component.

In a polyacrylonitrile-based polymer which satisfies the requirement [c] of PAN-based polymer, it is preferable that the Mwm of the Am component is preferably 400,000 to 4,000,000 and more preferably 700,000 to 2,000,000, and the Mw of the Bm component is 50,000 to 300,000. Since as the difference of the Mwm between the Am component and the Bm component becomes larger, the degree of polydispersity (Mzm/Mwm) of the mixed polymer is apt to become larger, and it is preferable, but when the Mwm of the Am component is larger than 4,000,000, productivity of the Am component lowers in some cases and when the Mwm of the Bm component is less than 50,000, strength of precursor fiber becomes insufficient in some cases, and for that reason, it is preferable that the degree of polydispersity (Mzm/Mwm) is controlled to 10 or less.

Concretely, it is preferable that a ratio of weight average molecular weight of the Am component to the Bm component is 2 to 30, more preferably 4 to 30 and still more preferably 6 to 30.

Furthermore, it is preferable that a weight ratio of Am component/Bm component is 0.001 to 0.3, more preferably 0.005 to 0.2 and still more preferably 0.01 to 0.1. When the weight ratio of the Am component to the Bm component is less than 0.001, the strain hardening becomes insufficient in some cases and when it is larger than 0.3, an extrusion viscosity of the polymer solution becomes too high and an extrusion becomes difficult in some cases. The Mwm and the weight ratio can be determined by peak splitting of peaks of molecular weight distribution measured by GPC-MALLS into shoulders and peak portions and calculating Mw and ratio of peak area of the respective peaks.

A polyacrylonitrile-based polymer which satisfies the requirement [d] of PAN-based polymer can be obtained by a method of mixing 2 kinds of polyacrylonitrile-based polymer different in weight average radius of gyration (Rw).

First, 2 kinds of polyacrylonitrile-based polymer to be mixed are explained. It is preferable that the Rw of the Am component is preferably 36 to 200 nm and more preferably 50 to 100 nm, and it is preferable that the Rw of the Bm component is 15 to 35 nm. As the difference of the Rw between the Am component and the Bm component becomes larger, the Rz/Rw of the mixed polymer is apt to become larger, and it is preferable, but when the Rw of the Am component is larger than 200 nm, productivity of the Am component decreases in some cases and when the Rw of the Bm component is less than 15 nm, strength of precursor fiber becomes insufficient in some cases, and therefore, it is preferable that the Rz/Rw is controlled to 2.5 or less.

Concretely, it is preferable that the ratio of weight average radius of gyration of the Am component to the Bm component is 1.2 to 10 and more preferably 1.5 to 5.

In addition, it is preferable that the weight ratio of Am component/Bm component is 0.001 to 0.25, more preferably 0.005 to 0.2 and still more preferably 0.01 to 0.1. When, the weight ratio of the Am component to the Bm component is less than 0.001, the strain hardening is insufficient in some cases, and when it is larger than 0.3, extrusion viscosity of the polymer solution becomes too high and an extrusion becomes difficult in some cases. The rotation radius of polymer largely depends upon molecular weight and branched structure and to control Rw of the Am component and the Bm component, it is easiest to control molecular weight, and in the case where the requirement [d] is satisfied by a linear polymer, the same molecular weight constitution as the method described in achieving means for satisfying the requirement [c] is preferable, but when its rotation radius is changed by the branched structure or copolymerization component, the rotation radius can be controlled by controlling molecular weight. The Rw and the weight ratio can be determined by measuring the A component and the B component, respectively, by a GPC-MALLS.

To prepare a polymer solution containing polymer of the A component and the B component, methods of mixing such as a method of dissolving in a solvent after mixing the both polymer, a method of mixing polymers dissolved in solvent with each other, respectively, a method of mixing and dissolving the B component after dissolving the A component which is a high molecular weight substance hard to be dissolved in a solvent, and a method of mixing the A component which is a high molecular weight substance in a solvent with the monomer constituting B component monomer and subjected to a solution polymerization, can be employed. In view of dissolving the high molecular weight substance uniformly, the method of dissolving at first the A component which is a high molecular weight substance is preferable. In particular, in the case where it is used for producing a carbon fiber precursor, the state of dissolution of the A component which a high molecular weight substance is extremely important, and in the case where even a very small amount of undissolved substance is present, it becomes to an foreign substance and forms voids in inside of carbon fiber in some cases.

As the production method of the polyacrylonitrile-based polymer, it is preferable to, after adjusting polymer concentration of the A component in solvent to preferably 0.1 to 5 wt %, mix the B component, or mix the monomer constituting B component and polymerize. The polymer concentration of the above-mentioned A component is more preferably 0.3 to 3 wt % and still more preferably 0.5 to 2 wt %. It is preferable that the polymer concentration of the above-mentioned A component is, more concretely, as it assembled state, controlled into a semi-dilute solution in which the polymer slightly overlaps and the component is mixed, or it is a more preferable aspect to control the polymer into a dilute solution in which the polymer becomes to a state of isolated chain, since the mixed state is apt to become uniform when the monomer constituting B component is mixed and polymerized. Since the concentration to become the dilute solution is considered to be determined by intramolecular excluded volume which is determined by molecular weight of polymer and solubility of polymer to solvent, it cannot be necessarily decided but, by controlling into approximately the above-described range, performance of carbon fiber can be maximized in most cases. In the case where the above-mentioned polymer concentration exceeds 5 wt %, an undissolved substance of the A component remains in some cases, and in the case where it is less than 0.1 wt %, although it also depends upon molecular weight, the effect has been saturated in most cases since the solution has already been a dilute solution.

The method in which, after the polymer concentration of the A component to solvent is controlled into preferably 0.1 to 5 wt %, the B component is mixed and dissolved therewith is acceptable, but in view of simplifying the process, the method is more preferable in which a high molecular weight substance diluted with a solvent is mixed with the monomer constituting B component and the monomer is solution polymerized.

As a method to make polymer concentration of the A component in solvent 0.1 to 5 wt %, a method in which the polymer is dissolved in a solvent and then diluted and also a method of polymerization from monomer are acceptable. In the case where the polymer is dissolved and diluted, it is important to stir until it can be uniformly diluted, and as it dilution temperature, 50 to 120° C. is preferable, and dilution time may be decided appropriately since it is different depending on dilution temperature or concentration before the dilution. In the case where the dilution temperature is lower than 50° C., the dilution takes a long time in some cases and, in the case where it exceeds 120° C., the A component may deteriorate.

In view of the decreasing step of the overlapping of polymer and mixing uniformly, after preparation of the above-mentioned A component, and before starting to mix with it the above-mentioned B component or before starting polymerization of the monomer constituting B component, it is preferable to control the polymer concentration of A component to the solvent into the range of 0.1 to 5 wt %. Concretely, it is a method in which, when the A component is prepared by a solution polymerization, the polymerization is stopped at a polymer concentration of 5 wt % or less, and the B component is mixed with it or the monomer constituting B component is mixed and the monomer is polymerized.

Usually, when the ratio of feeding monomer to the solvent is small, since it is impossible to produce a high molecular weight substance by solution polymerization in most cases, the ratio of the feeding monomer is increased, but in a stage of polymer concentration of 5 wt % or less, the degree of polymerization is low and much amount of unreacted monomer remains. It is no problem to mix the B component after removing the unreacted monomer by evaporation, but in view of simplifying the process, it is preferable to solution polymerize the B component by using the unreacted monomer. Concretely, the polymerization initiator is introduced into a solution containing a monomer of which main component is acrylonitrile (may be abbreviated as AN) and the A component is prepared by solution polymerization, and before finishing the solution polymerization, the B component is prepared by additionally introducing the polymerization initiator separately to solution polymerize residual unreacted monomer, and it is possible to obtain an AN-based polymer composition in which the A component and the B component are mixed. That is, according to a preferable production method of the PAN-based polymer composition, the polymerization initiator is weighed and introduced at least 2 times separately, and a ratio of amount weighed and introduced of the polymerization initiator at the first time to other amount weighed and introduced (amount weighed and introduced at first time/ other amount weighed and introduced) is made into 0.1 or less, preferably 0.01 or less and more preferably 0.003 or less. Since as the amount of polymerization initiator at the first time is smaller, the molecular weight increases more, in the case where the ratio of the amounts weighed and introduced (amount weighed and introduced at the first time/other amount weighed and introduced) exceeds 0.1, a necessary Mw is hard to be obtained in some cases. On the other hand, in the case where the amount of polymerization initiator is small, since polymerization speed becomes low and productivity is easy to decrease, it is preferable that a lower limit of the ratio of amounts weighed and introduced (amount weighed and introduced at first time/other amount weighed and introduced) is 0.0001. What is most important is the amount of radical produced by the polymerization initiator, and other than the amount of polymerization initiator, the preferable range also varies by changing polymerization temperature and kind of polymerization initiator of the first time and thereafter, but preferable range of ratio of such amounts weighed and introduced is within the range of 0.0001 to 0.1.

To control the Mw of the A component, it is important to control mole ratio of AN to the polymerization initiator, and regarding respective amounts weighed and introduced at the first time, a ratio of AN and the polymerization initiator (polymerization initiator/AN) is preferably $1 \times 10^{-7}$ to $1 \times 10^{-4}$, and regarding amount weighed and introduced at the second time or thereafter, a molar ratio of total AN (regardless of reacted or unreacted) and the polymerization initiator (polymerization initiator/AN) introduced before that is preferably $5 \times 10^{-4}$ to $5 \times 10^{-3}$. In the case where the copolymerization composition is changed between the A component and the B component, it is no problem to add a monomer capable of copolymerization when the polymerization initiator of the second time or thereafter is weighed and introduced, or it is also no problem to additionally add AN, a chain transfer agent or a solvent.

As the polymerization initiator, an oil-soluble azo-based compound, a water soluble azo-based compound, a peroxide or the like are preferable, and in view of handling properties in safety and carrying out industrially an effective polymerization, a polymerization initiator of which radical generation temperature is in the range of 30 to 150° C., more preferably in the range of 40 to 100° C., is preferably used. Among them, an azo-based compound which has no fear of generating oxygen when it is decomposed, which may disturb polymerization, is preferably used, and in the case of polymerization by solution polymerization, an oil-soluble azo compound is preferably used in view of solubility. As concrete examples of the polymerization initiator, 2,2'-azobis(4-methoxy-2,4-dimethyl valeronitrile) (radical generation temperature 30° C.), 2,2'-azobis (2,4'-dimethyl valeronitrile) (radical generation temperature 51° C.), and 2,2'-azobisisobutylonitrile (radical generation temperature 65° C.) or the like are mentioned. As the polymerization initiator of the first time and other than that, the same polymerization initiator may be used, or the amount of radical generated by the polymerization initiator can be controlled by combining plural polymerization initiators and polymerization temperatures. In the case where a peroxide is used, a reducing agent may be used together to accelerate the generation of radical.

A preferable range of the polymerization temperature varies also by kind and amount of the polymerization initiator, but it is preferably 30° C. or more and 90° C. or less. When the polymerization temperature is lower than 30° C., amount of radical generated by the polymerization initiator decreases and when a polymerization initiator of which radical generation temperature is low is used, its storage becomes difficult in most cases, and when polymerization temperature exceeds 90° C., since it is higher than the boiling point of AN, production control becomes difficult in most cases. The polymerization after introducing the polymerization initiator of the first time and the polymerization after introducing the polymerization initiator of the second time or thereafter may be carried out at a same polymerization temperature, or may be carried out at different polymerization temperatures.

Regarding a determination of weight content ratio of the A component to the total polymer, in the case where the B component is mixed, weight of the A component before the mixing and weight of the total PAN-based polymer composition after the mixing are measured, and it can be calculated from the weight ratio. In the case where the monomer is solution polymerized by mixing with the monomer constituting B component, after the A component is polymerized, a degree of polymerization of the A component is measured by using the solution before the polymerization initiator for polymerizing the B component is weighed and introduced, to determine the weight of A component in the solution, and separately, a weight of total PAN-based polymer obtained from the polymer composition concentration of the total PAN-based polymer composition solution is determined, and it can be calculated from the weight ratio.

As the A component preferably used, it is preferable to be compatible with PAN, and in view of compatibility, it is preferable to be a PAN-based polymer. As its composition, it is preferable that acrylonitrile is 98 to 100 mol %, and a monomer capable of copolymerization with AN is 2 mol % or less may be copolymerized, but in the case where a chain transfer constant of the copolymerization component is smaller than that of AN and a necessary Mw is hard to be obtained, it is preferable to decrease the amount of the copolymerization component as low as possible.

In the A component, as monomers capable of copolymerization with AN, for example, acrylic acid, methacrylic acid, itaconic acid and alkali metal salts thereof, ammonium salt and lower alkyl esters, acrylamide and derivatives thereof, ally sulfonic acid, methallyl sulfonic acid and salts thereof, alkyl esters, etc., can be used. In the case it is used to produce a precursor fiber of carbon fiber, it is preferable that a degree of acceleration of stabilization is made almost the same as that of the B component in view point of improving tensile strength of carbon fiber to be obtained, and to accelerate stabilization with a small amount of copolymerization, itaconic acid is especially preferable.

The polymerization method of the PAN-based polymer which is the A component can be selected from a solution polymerization method, a suspension polymerization method, an emulsion polymerization method, etc. but for the purpose of uniform polymerization of AN and the copolymerization component, it is preferable to employ a solution polymerization method. In the case where a solution polymerization method is employed for the polymerization, as the solvent, for example, aqueous solution of zinc chloride, dimethyl sulfoxide, dimethyl formamide and dimethyl acetamide, etc., in which PAN is soluble are used. In the case where it is difficult to obtain necessary Mw, a solvent of which chain transfer constant is high, that is, a solution polymerization-method by an aqueous solution by zinc chloride or a suspension polymerization method by water is also preferably employed.

As the composition of the PAN-based polymer which is the B component preferably used, AN is preferably 98 to 100 mol %, and 2 mol % or less of a monomer capable of copolymerization with AN may be copolymerized, but as the amount of copolymerization component increases, molecular scission by a thermal decomposition at copolymerized portion becomes serious, and tensile strength of carbon fiber to be obtained decreases.

In the B component, as the monomer capable of copolymerization with AN, in view of accelerating stabilization, for example, acrylic acid, methacrylic acid, itaconic acid and alkali metal salts, ammonium salt and lower alkyl esters thereof, acrylamide and derivatives thereof, allyl sulfonic acid, methallyl sulfonic acid and salts or alkyl esters thereof, etc., can be used.

In view of stabilizing the extrusion, it is also a preferable aspect to cross-link AN main chain with a monomer capable of copolymerization. In the B component, as the monomer capable of copolymerization with AN, a compound expressed by (meth)acryloyl group-$C_{1-10}$ linear or branched alkyl group-X-linear or branched $C_{1-10}$ alkyl group-(meth)acryloyl group (alkyl group may be partially-substituted with hydroxy group, X is any one of cycloalkyl group, ester group and ester group-$C_{1-6}$ linear or branched alkyl group-ester group or can be abbreviated) is preferably used. In particular, a compound expressed by (meth)acryloyl group-$C_{2-20}$ linear or branched alkyl group-(meth)acryloyl group is preferable. As concrete compounds, ethylene glycol dimethacrylate, 1,3-butylene diol diacrylate, neopentyl glycol diacrylate, and 1,6-hexane diol diacrylate, etc., can be mentioned. The amount of copolymerization of the monomer capable of copolymerization which is used for cross-linking cannot be necessarily mentioned since an appropriate value varies according to molecular weight of the polymer, but it is preferably 0.001 to 1 mol parts with respect AN 100 mol parts, more preferably 0.01 to 0.3 mol parts and still more preferably 0.05 to 0.1 mol parts.

The polymerization method for producing the PAN-based polymer which is the B component can be selected from a solution polymerization method, a suspension polymerization method and an emulsion polymerization method, but for the purpose of uniformly polymerizing AN and the copolymerization component, it is preferable to employ a solution polymerization method. In the case where a solution polymerization method is employed to polymerize, as the solvent, for example, solvents in which PAN is soluble such as aqueous solution of zinc chloride, dimethyl sulfoxide, dimethyl formamide and dimethyl acetamide are preferably used. Among them, in view of solubility of PAN, it is preferable to use dimethyl sulfoxide.

The PAN-based polymer solution is a solution in which the PAN-based polymer is dissolved in a solvent, and it is preferable that an elongational viscosity is 10,000 Pa·s or more, more preferably 50,000 Pa·s or more and still more preferably 100,000 Pa·s or more. There is especially no upper limit of the elongational viscosity, but a value of 1,000,000 Pa·s is sufficient in most cases.

The elongational viscosity indicates stiffness of deformation at an extensional deformation, and in general, in the case of Newtonian fluid, it becomes 3 times of shear viscosity, but in the case of Non-Newtonian fluid, there is a nonlinearity and since a measurement of itself is essential, it means a value measured by the following way. That is, approximately 0.1 ml PAN-based polymer solution maintained at a temperature of 35° C. is sealed between a couple of circular plates of 4 mm diameter arranged coaxially and vertically (gap 2 mm) such that it does not flow out, and when the upper plate is pulled up 18 mm in a time of 50 ms and kept as it is, a change of filament diameter from just after finishing the pulling up is measured, and it is the value determined by averaging the largest 3 points from the values calculated by the following equation (hereafter, referred to as the maximum vale):

$$\eta_E(t)=\{\sigma/D(t)\}/\{-2/D(t)\times dD/dt\}.$$

(In the equation, $\eta_E(t)$ is the elongational viscosity (Pa·s), σ is surface tension of polymer (mN/m) and D(t) is filament diameter at a time of t, respectively.)

The above-mentioned surface tension is measured by the Wilhelmy method using a platinum plate. Measuring temperature is 35° C. The above-mentioned elongational viscosity can be, concretely, measured by using an elongational viscometer, CaBER1 produced by Thermo Haake GmbH. In the above-mentioned elongational viscometer, a sample is sealed between a couple of circular plates arranged coaxially and vertically, and the upper plate is pulled up and maintained as it is, and change of filament diameter of the sample is measured by a laser micrometer. The filament diameter of the sample decreases with lapse of time and is broken finally, but the change of filament diameter is not rapid and is apt to decrease gradually, and as it takes longer time until being broken, the elongational viscosity is higher. In the case where the pulling up speed of the plate is set to low as approximately 20 mm/min, since it is strongly affected by shear viscosity, it takes a long time to be broken in some cases, but even by using a polymer solution of which breaking time is long in such a measurement, an increasing effect of spinning speed is not found and the pulling up speed of the plate must be raised to 20 m/min or more.

In the case of a Newtonian fluid, elongational viscosity becomes 3 times of shear viscosity, but when shear viscosity is raised to raise elongational viscosity, an extrusion from spinneret becomes difficult. For that reason, it is preferable that, elongational viscosity is low when a strain is small, and as the strain becomes large; the strain hardening appears and the elongational viscosity increases. The ratio of the maximum value and the minimum value of the elongational viscosity is preferably 100 times or more and more preferably 1,000 times or more. There is especially no upper limit in the ratio of the maximum value to the minimum value of the elongational viscosity, but even if it is 100,000 times, it is sufficient in most cases.

The minimum value of the elongational viscosity is an averaged value of the smallest 3 points. Such a PAN-based polymer solution, since it is stabilized by flowing, can increase spinning speed, and in addition, can increase draft ratio at spinning. Such a PAN-based polymer solution can be obtained by dissolving the above-mentioned PAN-based polymer into a solvent in which the PAN-based polymer is soluble such as dimethyl sulfoxide, dimethyl formamide or dimethyl acetamide.

In the PAN-based polymer solution, it is preferable that the ratio of the storage modulus at a frequency determined by dynamic viscoelasticity of 50 rad/s to the storage modulus at a frequency of 0.05 rad/s is 5 to 500, more preferably 10 to 100 and most preferably 20 to 50. When the ratio of storage modulus is smaller than 5, an influence of long-term relaxation component contained in the polymer is big, and at extrusion of the polymer solution from spinneret, an cohesive failure is apt to occur in some cases, and when the ratio of storage modulus is larger than 500, the influence of long-term relaxation component contained in the polymer is almost not found and at extrusion of the polymer solution from spinneret, a capillary failure is apt to occur in some cases. Usually, when the dependency of the storage modulus on frequency is measured, as the frequency becomes lower, the storage modulus decreases more and its inclination approaches to 2. By compounding a high molecular weight component, that is, by compounding a component having a long relaxation time, even in a low frequency side, a shear deformation of polymer becomes hard to be relaxed, and the dependency on frequency becomes small. For that reason, it is estimated that the component having a long relaxation time connects between molecules to make polymer solution from spinneret hard to be broken at the time of extrusion.

The ratio of storage modulus at frequency-determined by dynamic viscoelasticity of 50 rad/s to storage modulus at frequency of 0.05 rad/s is a value determined by the following way. That is, it is a value determined by DMA method (dynamic mechanical analysis method), in which a polymer solution 0.3 ml is set to a cone plate of 25 mm diameter and an angle of 0.04 rad as a gap of 0.056 mm, and from data measured by scanning from frequency of 0.05 to 50 rad/s under condition of a measuring temperature of 35.0° C. and a strain of 200%, and value at 0.05 rad/s and value at 50 rad/s are employed to calculate.

In the PAN-based polymer solution, it is preferable that a ratio of shear viscosity at shear rate of $20\ s^{-1}$ measured by cone-plate viscometer to shear viscosity at shear rate of $2,000\ s^{-1}$ is 10 to 50 and more preferably 20 to 40. When the ratio of shear viscosity is less than 10, the viscosity is too high at an extrusion of polymer solution from a spinneret and the extrusion is difficult in some cases, and when the ratio of shear viscosity is larger than 50, at an extrusion of polymer solution from a spinneret, an non-uniformity of extrusion between spinneret holes is apt to arise in some cases. Usually, when a dependency on shear rate of shear viscosity is measured, the higher the shear rate, the lower the shear viscosity, but in the PAN-based polymer solution, it is estimated that, even at a high shear rate, that is, in even a condition where polymers approach and pass through without a chance of entanglement, a decrease of shear viscosity is small by entanglement of high molecular weight component being maintained. Depending on temperature distribution in spinneret or flow of polymer solution, a difference of pressure may arise in each spinneret hole to cause a difference of shear rate, but when the dependency on shear rate of shear viscosity is small, non-uniformity of extrusion between spinneret holes can be decreased.

The ratio of shear viscosity at shear rate of $20\ s^{-1}$ to shear viscosity at shear rate of $2,000\ s^{-1}$ measured by cone-plate viscometer is a value measured by the following way. That is, a polymer solution 0.3 ml is set in a cone plate of 25 mm diameter and an angle of 0.04 rad as a gap of 0.056 mm in viscometer, and from data measured by scanning from shear rate of 2 to $2500\ s^{-1}$ under condition of a measuring temperature of 35.0° C., and a value at $20\ s^{-1}$ and a value at $2,000\ s^{-1}$ are employed to calculate.

Next, a production method of precursor fiber of carbon fiber is explained. First, the above-described PAN-based polymer is dissolved in a solvent in which the PAN-based polymer is soluble such as dimethyl sulfoxide, dimethyl formamide or dimethyl acetamide to prepare a spinning solution. In the case where a solution polymerization is employed, when solvents used for polymerization and used for spinning are the same, steps for separating the obtained polyacrylonitrile and for re-dissolving into a spinning solvent become unnecessary. In the PAN-based polymer solution, a solvent in which the PAN-based polymer coagulates (so-called, coagulant) such as water, methanol, ethanol may be contained in a range in which the PAN-based polymer does not coagulate and a component such as antioxidant or polymerization inhibitor may be contained up to 5 wt % with respect to the PAN-based polymer.

It is preferable that a polymer concentration of the PAN-based polymer solution is in the range of 15 to 30 wt %, more preferably 17 to 25 wt % and most preferably 19 to 23 wt %. When the polymer concentration is lower than 15 wt %, an amount of solvent used becomes large and it is not economical and decreases coagulation speed in coagulation bath, and it generates voids inside and a dense structure cannot be obtained in some cases. On the other hand, when the polymer concentration exceeds 30 wt %, viscosity increases and a spinning becomes difficult in some cases. The polymer concentration of spinning solution can be controlled by amount of solvent used.

The polymer concentration is wt % of the PAN-based polymer contained in the PAN-based copolymer solution. Concretely, after the PAN-based copolymer solution is weighed, and after the weighed PAN-based copolymer solution is mixed with a solvent which does not dissolve the PAN-based copolymer, and in addition, which is compatible with the solvent used for the PAN-based copolymer solution, to desolvate the PAN-based copolymer solution, the PAN-based copolymer is weighed. The polymer concentration is calculated by dividing the weight of PAN-based copolymer after the desolvation by the weight of PAN-based copolymer solution before the desolvation.

Furthermore, it is preferable that a viscosity of the PAN-based polymer solution at a temperature of 45° C. is in the range of 150 to 2,000 poise, more preferably 200 to 1,500 poise and still more preferably 300 to 1,000 poise. When the solution viscosity is lower than 150 poise, since a shape-forming ability of spun yarn deteriorates, take-up speed of the yarn extruded from a spinneret, is apt to deteriorate. When the solution viscosity exceeds 2,000 poise, it becomes easy to be gelled, and a stable spinning is apt to become difficult. The viscosity of spinning solution can be controlled by amount of polymerization initiator or chain transfer agent, etc.

The viscosity of PAN-based polymer solution at a temperature of 45° C. can be measured by a B-type viscometer. Concretely, after adjusting temperature of the PAN-based polymer solution put in a beaker by immersing in a warm water bath of which temperature is adjusted to a temperature of 45° C., by using as a B-type viscometer, for example, B8L-type viscometer produced by Tokyo Keiki Inc., and using rotor No. 4, when a viscosity of the PAN-based polymer solution is in the range of 0 to 1,000 poise, it is measured at rotation of rotor of 6 r.p.m., and when a viscosity of the spinning solution is in the range of 1,000 to 10,000 poise, it is measured at rotation of rotor of 0.6 r.p.m.

Before spinning the PAN-based polymer solution, in view of obtaining a high strength carbon fiber, it is preferable to remove impurities, incorporated in starting materials of the polymer or in respective steps, by passing the solution, for example, through a filter of which pore size is 1 μm or less.

In any spinning method of wet spinning, dry spinning and dry-wet spinning of the above-described PAN-based polymer solution, a generation of a fuzz can be prevented and they are preferable, but especially; it is preferable to produce a precursor fiber of carbon fiber by a spinning of dry-wet spinning method, since it increases spinning speed, and in addition, increases draft ratio at spinning. The dry-wet spinning method is a spinning method in which a spinning solution is once extruded in the air from a spinneret and then it is coagulated by being introduced into a coagulation bath.

It is preferable that a draft ratio at spinning of the PAN-based polymer solution is in the range of 12 to 100 times, and the draft ratio at spinning is more preferably within the range of 13 to 50 times and still more preferably within the range of 13 to 35 times. At this time, the draft ratio at spinning is the value obtained by dividing the surface speed (winding speed of coagulated fiber) of roller having a driving source (first roller) with which spun yarn (filament) contact first after leaving spinneret by the linear speed (linear extrusion rate) in spinneret holes of the PAN-based polymer solution. This linear extrusion rate is the value obtained by dividing the volume of polymer solution extruded per unit time by the area of spinneret hole. Accordingly, the linear extrusion rate is decided by a relation between an amount of extruded solution and a spinneret hole diameter. The PAN-based polymer solution gradually coagulates by contacting with a coagulant-solution after extruded from spinneret holes to become filaments. At this time, the filaments are pulled by the first roller, but since uncoagulated spinning solution is more extensible than the filaments, the draft ratio at spinning is inevitably the ratio of being drawn before solidification of the spinning solution. That is, draft ratio at spinning is expressed by the following equation:

draft ratio at spinning=(winding speed of coagulated fiber)/(linear extrusion rate).

Increasing the above-mentioned draft ratio at spinning largely contributes to a decrease in fiber diameter. When the polyacrylonitrile-based polymer solution is used as a spinning solution, and in the case where a draft ratio at spinning does not exceed 12 times, it is difficult to make single fiber thickness of PAN-based fiber into 0.2 dtex or less, and for decreasing the single fiber thickness, it is preferable to increase the draft ratio at spinning. In view of improving of productivity, it is preferable that the draft ratio at spinning is as high as possible, but since fiber breakage increases at spinneret surface, it is practically 100 or less. It is preferable that the linear extrusion rate is 0.1 to 30 m/min. When the linear extrusion rate is less than 0.1 m/min, productivity decreases. On the other hand, when the linear extrusion rate exceeds 30 m/min, liquid surface disturbance of the coagulation bath becomes significant and a non-uniformity is caused in the fiber thickness to be obtained in some cases.

It is preferable that the winding speed of coagulated fiber determined by the linear extrusion rate and the draft ratio at spinning is 50 to 500 m/min. When the winding speed is less than 50 m/min, productivity decreases, and when the winding speed exceeds 500 m/min, liquid surface disturbance of the coagulation bath becomes serious and a non-uniformity is apt to arise in the fiber thickness to be obtained.

It is preferable that the spinning hole diameter of the spinneret is 0.05 mm to 0.3 mm and more preferably 0.1 to 0.15 mm. In the case where the spinneret hole diameter is smaller than 0.05 mm, it is necessary to extrude the spinning solution from the spinneret at a high pressure, to decrease durability of the spinning apparatus, and further, an extrusion from nozzle becomes difficult. On the other hand, when the spinneret hole diameter exceeds 0.3 mm, it becomes difficult to obtain a fiber of which single fiber thickness is 1.5 dtex or less in some cases.

It is preferable that, in the coagulation bath, the solvent used as the PAN-based polymer solution such as dimethyl sulfoxide, dimethyl formamide or dimethyl acetamide and so-called coagulation accelerating component are contained. As the coagulation accelerating component, a compound which does not dissolve the above-mentioned PAN-based polymer, and in addition, which is compatible with the solvent used in the PAN-based polymer solution is preferable, concretely, it is preferable to use water. As conditions to be the coagulation bath, it is preferable to control that a cross-section of coagulated fiber (single fiber) becomes true circle, and concentration of organic solvent is 70% or less of the concentration of so-called critical bath concentration. When the concentration of organic solvent is high, a washing process of solvent after that becomes long and productivity decreases. For example, in the case where dimethyl sulfoxide is used as the solvent, it is preferable to make concentration of dimethyl sulfoxide aqueous solution to 5 to 55 wt %, and further preferably, it is preferable to make it to 5 to 30 wt %. It is preferable that the temperature of coagulation bath is controlled such that the side of fiber becomes smooth, i.e., −10 to 30° C., and further preferably, to be −5 to 5° C. is preferable.

After the PAN-based polymer solution is introduced into the coagulation bath to coagulate and form a yarn, by passing through a washing step, a drawing-in-bath step, an imparting step of oil agent and a drying step, a precursor-fiber of carbon fiber is obtained. To the above-mentioned steps, a dry-heat drawing step or a steam-drawing step may be added. The yarn after the coagulation may be directly subjected to a drawing-in-bath without washing with water, or may be subjected to a drawing-in-bath after removing solvent by a washing step with water. It is preferable that the drawing-in-bath is carried out in a single or multiple drawing bathes at a temperature of, usually, 30 to 98° C. It is preferable that a draw ratio at that time is 1 to 5 times and more preferably 1 to 3 times.

After the drawing-in-bath step, for the purpose of preventing a adhesion between single fibers, it is preferable to impart an oil agent composed such as of a silicone to the drawn fiber yarn. As the silicone oil agent, it is preferable to use a modified silicone of which heat resistance is high such as an amino-modified silicone.

As the drying step, publicly known methods can be employed. For example, a preferable result can be obtained by a drying condition of a drying temperature of 70 to 200° C. and a drying time of 10 seconds to 200 seconds. For improving productivity or for improving degree of crystalline orientation, it is preferable to draw in a heating medium after the drying step. As the heating medium, for example, pressure steam or over-heated steam is preferably used in view of production stability or cost, and it is preferable that the draw ratio is 1.5 to 10 times. Total draw ratio of the coagulated fiber from winding (that is, the first roller) is preferably 10 to 35 times, and by using the polymer, a high draft ratio at spinning and a high total draw ratio of the coagulated fiber after the winding can be achieved.

It is preferable that a single fiber thickness of thus obtained precursor fiber of carbon fiber is 0.01 to 1.5 dtex, more preferably 0.05 to 1.0 dtex and still more preferably 0.1 to 0.8 dtex. When the single fiber thickness is too small, due to an occurrence of yarn breakage or the like by contacting with rollers or guides, process stabilities of the fiber producing process and the stabilization-carbonization process of carbon fiber decreases in some cases. On the other hand, when the single fiber thickness is too large, a structural difference between inner and outer portions of each fiber after the stabilization becomes large, and processability in successive carbonization process decreases or tensile strength and tensile modulus of the carbon fiber to be obtained decreases in some cases. The single fiber thickness (dtex) is the weight of single fiber (g) per 10,000 m.

It is preferable that the degree of crystalline orientation of the precursor fiber of carbon fiber is 85% or more and more preferably 90% or more. When the degree of crystalline orientation is lower than 85%, strength of the precursor fiber to be obtained decreases in some cases.

The obtained precursor fiber of carbon fiber is, usually, in a shape of continuous fiber (filament). The number of filaments per 1 yarn (multi-filament) is preferably 1,000 to 3,000,000 filaments, more preferably 12,000 to 3,000,000 filaments, still more preferably 24,000 to 2,500,000 filaments and most preferably 24,000 to 2,000,000 filaments. Since drawability of the precursor fiber of carbon fiber to be obtained is high and single fiber thickness is small, it is preferable that the number of filaments per 1 yarn is large for the purpose of improvement of productivity, but if it is too large, it cannot be subjected to a uniform stabilization treatment up to inside of bundle in some cases.

Next, the production method of carbon fiber is explained.

After subjecting the precursor fiber of carbon fiber produced by the above-described method to a stabilization treatment in the air of a temperature of 200 to 300° C. while drawing preferably at a draw ratio of 0.8 to 2.5, it is subjected to a pre-carbonization treatment in a temperature of 300 to 800° C. in an inert atmosphere while drawing preferably at a draw ratio of 0.9 to 1.5, and subjected to a carbonization treatment in an inert atmosphere of a maximum temperature of 1,000 to 3,000° C. While drawing preferably at a draw ratio of 0.9 to 1.1, to produce a carbon fiber. In particular, in view of increasing, tensile modulus of carbon fiber, it is preferable to carbonize at a tension of carbonization of 5.9 to 13.0 mN/dtex-precursor fiber. When the tension of carbonization is lower than 5.9 mN/dtex-precursor fiber, it is not preferable since the relation between the tensile modulus and the crystallite size cannot be satisfied in some cases. It is not preferable to carbonize at a tension of carbonization, exceeding 13.0 mN/dtex-precursor fiber, since it is difficult in some cases due to limitation in equipment such as rolls for conveying the yarn.

The tension at carbonization process is expressed by the value obtained by converting a tension (mN) measured before the roll of exit side of carbonization furnace in terms of single fiber and it is divided by fiber thickness (dtex) of the precursor fiber of carbon fiber absolutely dried.

The pre-carbonization treatment or carbonization treatment is carried out in an inert atmosphere, but as a gas used for the inert atmosphere, nitrogen, argon and xenon or the like can be exemplified and in economical view point, nitrogen is preferably used. In the pre-carbonization treatment, it is preferable to set the heating speed in the temperature range to 500° C./min or less. The maximum temperature in the carbonization treatment can be made into 1,200 to 3,000° C. depending on mechanical properties of desired carbon fiber, but since, in general, as higher the maximum temperature in the carbonization, treatment is, as higher the tensile modulus of the carbon fiber to be obtained becomes, but since the tensile strength reaches maximum at around 1,500° C. for the purpose of raising both of the tensile strength and the tensile modulus, it is preferable that the maximum temperature of the carbonization treatment is 1,200 to 1,700° C. and more preferably 1,300 to 1,600° C.

Furthermore, when an application to aircraft is considered, weight reduction is important and in view of increasing tensile modulus, it is also preferable that the maximum temperature of carbonization treatment is 1,700 to 2,300° C. Regarding the maximum temperature of carbonization treatment, the higher the maximum temperature, the higher the tensile modulus, but a graphitization is developed and due to growth and lamination of carbon net plane, the carbon net plane is apt to be buckled, and since compressive strength may decrease as a result, the temperature of the carbonization process is determined in consideration of a balance of both.

Thus obtained carbon fiber is a carbon fiber of which crystallite size (Lc(nm)), tensile modulus of strand (YM(GPa)) and spin density of localized electron (LS(spin/g)) measured by electron spin resonance (may be abbreviated as ESR) satisfy the following equations (1) to (3):

$$2.6 \leq Lc \leq 3.4 \quad (1)$$

$$50Lc+250 < YM \leq 50Lc+320 \quad (2)$$

$$0.5 \times 10^{18} \leq LS < 2.2 \times 10^{18} \quad (3).$$

First, the meaning of each parameter is explained. Carbon fiber is a polycrystal substance constituted with numerous graphite crystallites. When the maximum temperature of carbonization treatment is raised, crystallinity of the crystallite increases, that is, rearrangement of the carbon net plane occurs and crystallite size increases, and since crystalline orientation is advanced developed simultaneously with that, tensile modulus of carbon fiber increases. That is, under other conditions maintained constant, when the carbonization treatment temperature is raised, both of Lc and YM increase. Tension is the condition which gives significant influence to carbon fiber characteristics at the carbonization treatment. Under other condition maintained constant at the carbonization treatment, when the tension is raised at the carbonization treatment under other condition maintained constant; crystallite size Lc does not change, while YM increases with crystalline orientation. The spin density of localized electron, LS, measured by ESR is a characteristic corresponding to the density of lattice defect in crystallites. The LS is a characteristic which decreases as a decrease of lattice defect with the rearrangement of carbon net plane. Even if a molecular scission occurs by some reason, it decreases when the rearrangement of carbon net plane is developed. LS relates to defect generation by molecular scission induced by tension at the carbonization treatment, but when viewed from other point, the smaller value relates to growth of the carbon net plane. When crystallite size is less than 2.6 mm, the larger the crystallite size is, the smaller this value becomes. When crystallite size is above 2.6 nm, this value has almost no dependency on crystallite size.

The carbon fiber satisfies the relation of 50Lc+250<YM<50Lc+320, in the range of 2.6<Lc<3.4, on the other hand, carbon fiber conventionally used satisfies, in general, the relation of 50Lc+210<YM<50Lc+240, in the range of 2.6<Lc<3.4. By using the conventional precursor fiber of carbon fiber, in the range of 2.6<Lc<3.4, to develop orientation of crystallite to a level such that a carbon fiber in the range of 50Lc+250<YM<50Lc+320 can be obtained, it was necessary to carry out carbonization treatment at a high tension, but fuzzes were generated, and it was necessary to frequently remove the fuzzes or clingings to rollers caused by the fuzzes, and nothing more could be done other than obtaining a small amount of sample. On the other hand, by using the precursor fiber of carbon fiber obtained, since it becomes possible to carry out carbonization treatment at a higher tension, the carbon fiber could be produced.

Furthermore, in the carbon fiber, LS satisfies $0.5 \times 10^{18} < LS < 2.2 \times 10^{18}$. The meaning that LS satisfies this range is that the lattice defect is negligible. By using the precursor fiber of carbon fiber obtained, the carbon fiber can be obtained since, even tension is raised at carbonization treatment, not only the fuzz which can be visually observed but also a generation of defect by molecular scission could be prevented.

The lattice defect and the number of fuzzes correlate with each other and decreasing the lattice defect decreases the fuzz, which is a reflection of the lattice defect, and improves processability. In addition, if the carbon fiber has the same crystallite size, the compressive strength of carbon fiber could also be improved by the decrease of lattice defect. The reason is not necessarily clear, but it is understood as follows. The reason is estimated that, when a compressive stress is parallelly added to the carbon net plane, as the carbon net plane becomes larger, a buckling becomes easier to arise and the stress becomes more difficult to be born, but even in a same size of carbon net plane, when there is a defect in the carbon net plane, a buckling arises from that point, or when there is a defect in a vicinity of the carbon net plane, a buckling failure becomes easy to occur in the defect portion. In the case where the spin density of localized electron is $2.2 \times 10^{18}$ or more, the compressive strength decreases, and in the case where the spin density of localized electron is less than $0.5 \times 10^{18}$, since the compressive strength does not decrease and since the effect is saturated, the tensile modulus should be improved by drawing further in the carbonization process.

A precursor fiber with negligible micro defect can be produced by that the PAN-based polymer has a broad molecular weight distribution in a high molecular weight side and the orientation is developed as a whole while the stress at drawing step being born by the high molecular weight component, and further, the spin density of localized electron relating to the defect can be controlled by the tension of carbonization and the carbonization temperature when the carbon fiber is produced.

In the case where the crystallite size of the carbon fiber is less than 2.6 nm, the crystallinity is low and the tensile modulus is low, and in case where it exceeds 3.4 nm, the compressive strength is low, and both of them are not preferable as a structural member in balance of tensile modulus and compressive strength. For a better balance, the crystallite size is preferably 2.6 to 3.0 nm. The crystallite size of carbon fiber can be controlled by carbonization temperature and when the carbonization temperature is raised, the crystallite size increases.

Although the tensile modulus exceeds 380 GPa and is 470 GPa or less, it became possible to obtain a carbon fiber of which tensile strength is 5.5 GPa or more and 0° compressive modulus of composite is 1.5 GPa or more.

It is preferable that an average single fiber diameter of the carbon fiber is 1.5 to 7.5 μm and more preferably 1.5 to 3.9 μm. When the average single fiber diameter is smaller than 1.5 μm, a problem arises that productivity decreases in some cases. When the average single fiber diameter is larger than 7.5 μm, since stabilization treatment of inner portion of single fiber becomes insufficient, a problem arises that the tensile modulus of strand is not improved in some cases. Thus, 1.5 to 3.9 μm is a preferable range because it is easy to make the average single fiber diameter into the range when the polymer solution is used, since extrusion stability increases drastically, and a decrease of productivity is hard to arise. Detail diameter may be selected from the balance of productivity and tensile modulus.

The obtained carbon fiber can be subjected to an electrolytic treatment for its surface modification. As an electrolyte used in the electrolytic treatment, an acidic solution such as sulfuric acid, nitric acid or hydrochloric acid, and an alkali such as sodium hydroxide, potassium hydroxide, tetraethyl ammonium hydroxide, ammonium carbonate or ammonium bicarbonate or salts thereof as an aqueous solution can be used. The amount of electric necessary for the electrolytic treatment can be appropriately selected depending on a degree of carbonization of carbon fiber to be applied.

By the electrolytic treatment, it is possible to make adhesion properties appropriate between the carbon fiber and a matrix in a fiber reinforced composite material to be obtained, and following problems are solved; a problem of a brittle breakage of composite material, a problem of decrease of tensile strength in fiber direction due to a too strong adhesion, or a problem that, although a tensile strength in fiber direction is high, adhesion properties with resin are low and strength characteristics in non-fiber direction is not exhibited. By a fiber reinforced composite material to be obtained, strength characteristics of good balance between both directions of fiber direction and non-fiber direction are exhibited.

After the electrolytic treatment, to impart a unity of bundle to the carbon fibers, it is also possible to carry out a sizing treatment. As the sizing agent, it is possible to appropriately select a sizing agent compatible with such as matrix resin according to kind of the resin to be used.

The carbon fiber obtainable is preferably used as aircraft members, pressure container members, automobile members or sporting members such as fishing rod or golf shaft, through various kinds of molding method such as moldings as a prepreg by an autoclave molding, as a preform such as of woven fabric by resin transfer molding, and a molding by filament winding.

EXAMPLE

Hereafter, our polymers and methods are explained in more detail with reference to examples. Measuring methods employed in the examples are explained in the following.
<Z+1-average molecular weight ($M_{Z+1}$), Z-average molecular weight (Mz), weight average molecular weight (Mw), number average molecular weight (Mn); GPC method>

A polymer to be measured is dissolved in dimethyl formamide (0.01N-lithium bromide is added) such that the concentration is 0.1 wt %, to obtain a solution to be tested. For the obtained solution to be tested, a molecular weight distribution curve was obtained from the GPC curve measured by using a GPC device in the following conditions (i) and (ii), and $M_{Z+1}$, Mz, Mw and Mn were calculated. The measurement was carried out 3 times and values of $M_{Z+1}$, Mz, Mw and Mn were averaged and used. Whereas, when data were different between the conditions (i) and (ii), the data in the condition (ii) was employed.
Condition (i)
  Column: polar organic solvent type column for GPC
  Flow rate: 0.8 ml/min
  Temperature: 40° C.
  Filtration of sample: membrane filter (0.45 μm cut)
  Amount of injection: 20 μl
  Detector: differential refractometer
A calibration curve of elusion time-molecular weight was prepared by using at least 3 kinds of single-distribution polystyrene different in molecular weight of which molecular weights are known, and Mw was determined by reading a molecular weight in terms of polystyrene corresponding to the elusion time on the calibration curve.
In the examples, CLASS-LC2010 produced by Shimadzu Corp. as the GPC device, TSK-GEL-α-M(×1) produced by Tosoh Corp.+TSK-guard Colume α produced by Tosoh Corp. as the column, dimethyl formamide and lithium bromide produced by Wako. Pure Chemical Industries, Ltd., 0.45μ-FHLP Filter produced by Millipore Corp. as the membrane filter, RID-10AV produced by Shimadzu Corp. as the differential refractometer and polystyrenes of molecular weight 184,000, 427,000, 791,000 and 1,300,000 as the single-distribution polystyrenes for preparing the calibration curve, were used, respectively.
Condition (ii)
  Column: polar organic solvent type column for GPC
  Flow rate: 0.5 ml/min
  Temperature: 70° C.
  Filtration of sample: membrane filter (0.45 μm cut)
  Amount of injection: 200 μl
  Detector: differential refractometer
A calibration curve of elusion time-molecular weight was prepared by using at least 6 kinds of single-distribution polystyrene different in molecular weight of which molecular weights are known, and the Mw was determined by reading a molecular weight in terms of polystyrene corresponding to the elusion time on the calibration curve.
In the examples, CLASS-LC2010 produced by Shimadzu Corp. as the GPC device, TSK-GEL-α-M(×2) produced by Tosoh Corp. as the column, dimethyl formamide and lithium bromide produced by Wako Pure Chemical Industries, Ltd., 0.45 μ-FHLP Filter produced by Millipore Corp. as the membrane filter, RID-10AV produced by Shimadzu Corp. as the differential refractometer and polystyrenes of molecular weight 184,000, 427,000, 791,000, 1,300,000, 1,810,000 and 4,240,000 as the single-distribution polystyrenes for preparing the calibration curve, were used, respectively.
<Z-average radius of gyration (Rz), weight average radius of gyration (Rw), Z-average molecular weight (Mz), weight average, molecular weight (Mw) and number average molecular weight (Mn); GPC-MALLS>

A polymer to be measured is dissolved in dimethyl formamide (0.01N-lithium bromide and 0.01M-diethyl amine are added) such that the concentration is 0.1 wt %, to obtain a solution to be tested. For the obtained solution to be tested, a molecular weight distribution curve was obtained from the GPC curve measured 1 time for each sample by using the GPC device in the following condition, and Rz, Rw, Mz, Mw and Mn were calculated. At this time, the Rz and Rw were calculated in accordance with a first-order approximation equation.
  Column: polar organic solvent type column for GPC
  Flow rate: 0.708 ml/min
  Temperature: 23° C.
  Filtration of sample: membrane filter (0.45 μm cut)
  Amount of injection: 200 μl
  Detector: multi-angle light scattering photometer, and, differential refractometer
In the examples, DAWN DSP produced by Wyatt Technology Corp. as the GPC device, TSK-GEL α-M+α-3,000 produced by Tosoh Corp. as the column were used, respectively.
<Elongational Viscosity>

Approximately 0.1 ml PAN-based polymer solution maintained at a temperature of 35° C. is sealed between a couple of circular plates of 4 mm diameter arranged coaxially and vertically (gap 2 mm) such that it does not flow-out, and when the upper plate is pulled up 18 mm in a time of 50 ms and kept as it is, a change of filament diameter from just after finishing the pulling up is measured, and it is determined by averaging the largest 3 points from the values calculated by the following equation:

$$\eta_E(t) = \{\sigma/D(t)\}/\{-2/D(t) \times dD/dt\}.$$

(In the formula, $\eta_E(t)$ denotes elongational viscosity (Pa·s), a denotes surface tension (mN/m) of polymer and D(t) denotes filament diameter at a time of t.)
The above-mentioned surface tension was measured by Wilhelmy method using a platinum plate. Measuring temperature was 35° C. In the examples, elongational viscometer, CaBER1 produced by Thermo Haake GmbH was used.
<Ratio of storage modulus at frequency determined by dynamic viscoelasticity of 50 rad/s to storage modulus at frequency of 0.05 rad/s>

It is a value determined by, setting a polymer solution 0.3 ml to a device and by using a cone plate of 25 mm diameter and an angle of 0.04 rad, and by scanning from frequency of 0.05 to 50 rad/s under condition of a gap of 0.056 mm, a measuring temperature of 35.0° C. and a strain of 200%. In the examples, by using ARES which is a DMA device produced by TA Instruments Inc., measurements were carried out 3 times, and the averaged value was employed.
<Ratio of shear viscosity at shear rate of 20 $s^{-1}$ measured by cone-plate viscometer to shear viscosity at shear rate of 2,000 $s^{-1}$>

It is a value determined, by setting a polymer solution 0.3 ml in viscometer using a cone plate of 25 mm diameter and an angle of 0.04 rad, and by scanning from a shear rate of 2 to 2500 $s^{-1}$ under condition of a gap of 0.056 mm and a measuring temperature of 35.0° C. In the examples, by using ARES which is a DMA device produced by TA Instruments Inc., measurements were carried out 3 times and the averaged value was employed.

<Criteria of Quality Grade of Precursor Fiber of Carbon Fiber>

Regarding the item to be tested, while conveying a fiber bundle of 6,000 filaments in 1 line at a speed of 1 m/min, the number of pill-fuzzes were counted and evaluated in 3 classes. The evaluation criteria are as follows:
 Class 1: 1 pill fuzz or less in fiber 300 m
 Class 2: 2 to 15 pill fuzzes in fiber 300 m
 Class 3: 16 pill fuzzes or more in fiber 300 m.

<Criteria of Quality Grade, of Carbon Fiber>

Regarding the item to be tested, after stabilization-carbonization and before surface treatment sizing treatment, while conveying a fiber bundle of 24,000 filaments in 1 line at a speed of 1 m/min, the number of pill fuzzes were counted and evaluated in 3 classes. The evaluation criteria are as follows:
 Class 1: 1 pill fuzz or less in fiber 30 m.
 Class 2: 2 to 15 pill fuzzes in fiber 30 m.
 Class 3: 16 pill fuzzes or more in fiber 30 m.

<Tensile Strength and Modulus of Carbon Fiber Bundle>

They were determined in accordance with JIS R7601 (1986) "Test Method of Resin Impregnated Strand." The resin impregnated strand of carbon fiber to be measured was prepared by impregnating carbon fiber or graphitized fiber with 3,4-epoxycyclohexyl methyl-3,4-epoxycyclohexyl carboxylate (100 parts by weight)/boron trifluoride monoethyl amine (3 parts by weight)/acetone (4 parts by weight), and by curing at a temperature of 130° C. for 30 minutes. 6 carbon fiber strand to be measured was set, and the average value of respective measurement results was taken as the tensile strength. In the examples, as the 3,4-epoxycyclohexyl methyl-3,4-epoxycyclohexyl carboxylate, "BAKELITE" (trademark) ERL4221 produced by Union Carbide Corp. was used.

<Spin Density of Localized Electron of Carbon Fiber by ESR>

After the carbon fiber to be measured was accurately weighed, by using an ESR device, a signal in the vicinity of g=2.002 was measured by changing temperature as described in the following:
 Central magnetic field: in the vicinity of 3377G
 Magnetic sweep width: 200G
 Modulation: 100 kHz, 2G
 Microwave: 9.46 GHz, 1 mW
 Sweep time: 83.886 sec×4 times
 Time constant: 327:68 ms
 Number of data points: 1024 points
 Measuring temperature: 10, 50, 100, 150, 200, 250, 296K.

The spectrum of the obtained differential curve is integrated twice to calculate the signal intensity. The signal intensity is converted into the number of spins per weight, using a standard sample having a known number of spins per weight (for example, an ion implanted polyethylene film, of which number of spins is determined using copper sulfate pentahydrate as a standard sample). With the obtained number of spins per weight at each temperature was made as y and the inverse number of the absolute temperature of the measuring temperature was made as x, coefficients a and b are obtained based on the linear equation of y=ax+b by the least square method, and the number of spins of coefficient a was taken as the spin density of localized electron (spin/g):

Whereas, in the examples and comparative examples, ESR device ESP350E produced by Bruker Corp. was used as the ESR device.

<Crystallite Size of Carbon Fiber>

The carbon fibers to be measured were aligned unidirectionally and fixed by using collodion alcohol solution, to prepare a square prism test piece having a height of 4 cm and each side length of 1 mm. For the prepared test piece, a measurement was carried out by using a wide angle X-ray diffractometer under the following conditions:
 X ray source: CuKα ray (tube voltage 40 kV, tube current 30 mA)
 Detector: Goniometer+Monochrometer+Scintillation counter
 Scanning range: 2θ=10 to 40°
 Scanning mode: Step scan, step interval 0.02°, counting time 2 seconds.

In the obtained diffraction pattern, a half width of the peak appearing in the vicinity of 2θ=25 to 26° was obtained, and based on the value, the crystallite size is calculated from the following Scherrer's equation:

$$\text{Crystallite size (nm)} = K\lambda/\beta_0 \cos\theta_B$$

where,
 K: 1.0, λ: 0.15418 nm (wavelength of X ray)
 $\beta_0$: $(\beta_E^2 - \beta_1^2)^{1/2}$
 $\beta_E$: Apparent half width (measured value) rad, $\beta_1$: 1.046×10$^{-2}$ rad
 $\theta_B$: Bragg diffraction angle.

Whereas, in the examples and comparative examples described later, XRD-6100 produced by Shimadzu Corp. was used as the above-mentioned wide angle X ray diffractometer.

<Average Single Fiber Diameter of Carbon Fiber>

For the carbon fiber bundle constituted with many carbon filaments, weight A (g/m) per unit length and specific gravity B (g/cm$^3$) are determined. With the number of filaments of the carbon fiber bundle to be measured as C, the average single filament diameter (μm) of the carbon fibers was calculated from the following equation:

$$\text{Average single fiber diameter of carbon fiber (μm)} = (A/B/C)/\pi)^{(1/2)} \times 2 \times 10^3.$$

<Measurement of Compressive Strength of Composite>

The following raw resins are mixed and stirred for 30 minutes to obtain a resin composition:
 Bisphenol A diglycidyl ether resin: 30 wt %
 Bisphenol A diglycidyl ether resin: 30 wt %
 Phenol: novolak polyglycidyl ether resin: 27 wt %
 Polyvinyl formal resin: 5 wt %
 Dicyandiamide: 4 wt %
 3-(3,4-dichlorophenyl)-1,1-dimethyl urea: 4 wt %.

Next, a release paper sheet coated with silicone is coated on the silicone surface with the obtained resin composition, to prepare a resin film, and it is wound around the surface of a steel drum having a circumference of about 2.7 m and controlled in a temperature range from 60 to 70° C. with the resin composition surface kept outside.

Then, a carbon fiber bundle unwound from a creel is aligned by a traverse on the surface of the resin composition wound around the steel drum. Furthermore, it was covered thereon with the above-described resin film with the resin composition surface kept carbon fiber bundle side, and the outside resin film surface was pressed while a separately prepared roll being contacted and rolled to impregnate the resin into the fiber bundle, to prepare a unidirectional prepreg of 300 mm width and 2.7 m length. The fiber weight of the prepreg was controlled to 190 to 200 g/m$^2$ by changing the rotation of drum and traversing speed.

A plurality of sheets of the obtained prepreg were laminated with the fiber direction kept in one direction, treated at a temperature of 130° C. and a pressure of 0.3 MPa for 2 hours to cure the resin, for forming, a laminate sheet of 1 mm thickness (fiber reinforced composite material), and from the laminate sheet, a test piece of 1±0.1 mm thickness, 12.7±0.13 mm width, 80±0.013 mm length and gauge portion length 5±0.13 mm was cut out. Whereas, both ends of the test piece (37.5 mm from both ends, respectively) were fixed with reinforcing plates by such as an adhesive to make into the gauge portion length of 5±0.13 mm.

In accordance with ASTM D695. (1996), in a condition of strain rate of 1.27 mm/min, for a number of the test pieces of n=6, compressive strengths were measured, and the obtained compressive strengths were converted to those of fiber volume ratio 60%, and the average value was taken as compressive strength of the composite.

Whereas, in the examples and comparative examples, "EPIKOTE" (trademark)1001 produced by Japan Epoxy Resins Co. as the above-mentioned bisphenol A diglycidyl ether resin, "EIPKOTE" (trademark) 828, produced by Japan Epoxy Resins Co. as above-mentioned bisphenol A diglycidyl ether resin, "EPICLON" (trademark)-N740, produced by Dainippon Ink and Chemicals Co. as the above-mentioned phenol novolac polyglycidyl ether resin, "VYNILEC" (trademark) K, produced by Chisso Corp. as the above-mentioned polyvinyl formal resin, DICY7 produced by Japan Epoxy Resins Co. as the above-mentioned dicyandiamide, and DCMU-99 (curing agent), produced by Hodogaya Chemical Co. as the above-mentioned 3-(3,4-dichlorophenyl)-1,1-dimethyl urea, were used, respectively.

DCMU-99 (curing agent), produced by Hodogaya Chemical Co. as the above-mentioned 3-(3,4- dichlorophenyl)-1,1-dimethyl urea, were used, respectively.

Example 1

AN 100 parts by weight, 2,2'-azobisisobutylonitrile (hereafter, maybe abbreviated as AIBN) 0.01 parts by weight, as a radical initiator, partially saponified polyvinyl alcohol (degree of polymerization 1,000) 1.5 parts by weight and water 290 parts by weight were mixed and put into a reactor equipped with a reflux condenser and a stirring blade. After the space in the reactor was replaced with nitrogen, a heat treatment of the following described condition (referred to as polymerization Condition A) was carried out while the content being stirred, and a PAN-based polymer was obtained by being polymerized by an aqueous suspension polymerization method.

(1) Heating from 30° C. to 70° C. (heating speed 120° C./hour)

(2) maintaining at a temperature of 70° C. for 2 hours

The obtained PAN-based polymer powder was sufficiently washed with water and dried to obtain a dried polymer A. The Mz, Mw and Mn of the obtained dried polymer A were, respectively, 5,800,000, 3,400,000 and 1,400,000.

3 parts by weight of the obtained dried polymer was uniformly dissolved in 370 parts by weight of dimethyl sulfoxide, and furthermore, 100 parts by weight of AN, 1 parts by weight of itaconic acid, 0.4 parts by weight of 2,2'-azobisisobutylonitrile as an radical initiator, and 0.1 parts by weight of octyl mercaptan as a chain transfer agent, were mixed and uniformly dissolved, and put into a reactor equipped with a reflux condenser and a stirring blade. After the space in the reactor is replaced with nitrogen, the heat treatment of the following described condition (referred to as polymerization condition B) was carried out while the content being stirred, and a PAN-based polymer solution was obtained by being polymerized by a solution polymerization method.

(1) Heating from 30° C. to 60° C. (heating speed 10° C./hour)

(2) Maintaining at a temperature of 60° C. for 4 hours (3) Heating from 60° C. to 80° C. (heating speed 10° C. hour)

(4) Maintaining at a temperature of 80° C. for 6 hours

The obtained PAN-based polymer solution was taken by approximately 10 g, poured in water to precipitate, and after it is washed with a hot water of 95° C. for 2 hours, dried at a temperature of 70° C. for 4 hours to obtain a dried polymer B. For the obtained dried polymer B, GPC measurement was carried out and the result is shown in Table 1.

After adjusting the polymer concentration of the obtained PAN-based polymer solution to 20 wt %, by blowing ammonia gas into the solution such that the pH becomes 8.5, to introduce an ammonium group in the PAN-based polymer while neutralizing itaconic acid, and a spinning solution was prepared. When elongational viscosity was measured by using the obtained PAN-based polymer solution, it was found to be $1.0 \times 10^5$ Pa·s, and the ratio of the maximum value to the minimum value was $1.7 \times 10^4$. Using the obtained PAN-based polymer solution, the storage modulus was measured by dynamic viscoelasticity and it was found that the storage modulus was 486 Pa when frequency was 50 rad/s and the storage modulus was 1.3 Pa when frequency was 0.05 rad/s and the ratio was 361. When the shear viscosity was measured by a cone-plate viscometer, it was found that the shear viscosity was 30 Pa·s when shear rate was 20 $s^{-1}$, and the shear viscosity was 0.95 when shear rate was 2,000 $s^{-1}$, and the ratio was 32. The obtained PAN-based polymer solution was passed through a filter of which pore size was 0.5 μm, and then at a temperature of 40° C., by using a spinneret having 6,000 holes and a spinneret hole diameter of 0.15 mm, it was spun by a dry-wet spinning method in which the solution was once extruded in the air, passed through a space of approximately 2 mm and then introduced into a coagulation bath composed of an aqueous solution of 20 wt % dimethyl sulfoxide controlled at a temperature of 3° C., to prepare a coagulated yarn. By making the linear extrusion rate at this time constant as 7 m/min, and by changing winding speed of the coagulated fiber, the critical draft ratio at spinning was measured. In the condition of draft ratio 4 at spinning, a coagulated yarn was obtained, washed with water, and then it was drawn in a hot water of 90° C. at a drawing-in-bath ratio of 3 times, furthermore, imparted with an amino-modified silicone-based silicone oil agent, dried by using a hot roller heated at a temperature of 165° C. for 30 seconds, subjected to a pressurized steam drawing to determine the critical steam draw ratio. The product of the drawing-in-bath ratio 3 and the critical steam draw ratio was taken as the critical drawing ratio after coagulation.

Furthermore, the preparation of the precursor fiber of carbon fiber was carried out by the following condition. A coagulated yarn was obtained in a condition of a linear extrusion rate 7 m/min and a draft ratio 24 at spinning. Thus obtained coagulated yarn was, after washed with water, drawn in a drawing-in-bath ratio of 3 times in a hot water of 90° C., furthermore, imparted with an amino-modified silicone-based silicone oil agent to obtain a drawn-in-bath yarn. Thus obtained drawn-in-bath yarn was dried using a roller heated at temperature of 165° C. for 30 seconds, 7 yarns were joined to make, total number of filaments 42,000, subjected to a pressurized steam drawing in a condition of steam draw ratio of 5 times, to obtain a precursor fiber of carbon fiber of which single fiber thickness was 0.1 dtex and a number of filaments of 42,000. The grade of the obtained the precursor fiber of carbon fiber was excellent and the fiber producing process was also stable. The obtained precursor fiber of carbon fiber was subjected to a stabilization treatment for 90 minutes while being drawn at a draw ratio 1.0 in the air having a temperature distribution of a temperature of 240 to 260° C., to obtain a stabilized fiber. Successively, the obtained stabilized fiber was subjected to a pre-carbonization treatment in nitrogen atmosphere having a temperature distribution of a temperature of 300 to 700° C. while being drawn at a draw ratio of 1.2, furthermore, it is subjected to a carbonization treatment in nitrogen atmosphere at a maximum temperature of 1500° C., in which the draw ratio was set to 0.97, to obtain a continuous carbon fiber. At this time, processabilities of both of the stabilization-carbonization processes were good.

When the physical properties of strand of the obtained carbon fiber bundle were measured, it was found that the strength was 8.0 GPa and the modulus was 325 GPa.

Example 2

3 parts by weight of the dried polymer A obtained in Example 1 was uniformly dissolved in 270 parts by weight of dimethyl sulfoxide, furthermore, 100 parts by weight of AN, 1 parts by weight of itaconic acid, 0.4 parts by weight of 2,2'-azobisisobutylonitrile as a radical initiator, and 0.3 parts by weight of octyl mercaptan as a chain transfer agent were mixed and uniformly dissolved and were put into a reactor equipped with a reflux condenser and a stirring blade. After the space in the reactor is replaced with nitrogen, the content was subjected to the heat treatment, of the above-mentioned polymerization condition B, while being stirred, to obtain a PAN-based polymer solution by being polymerized by a solution polymerization method.

After adjusting the obtained PAN-based polymer solution such that the polymer concentration was 25 wt %, ammonia gas was blown into the polymer solution to introduce an ammonium group into the PAN-based polymer while neutralizing itaconic acid until the pH became 8.5, to prepare a spinning solution. A spinning stabilization-carbonization evaluation was carried out in the same. way as Example 1, except changing the spinning solution. Both of the fiber producing process stabilization-carbonization process were good in processability, and grades of the obtained precursor fiber of carbon fiber and the carbon fiber were good.

Example 3

8 parts by weight of the dried polymer A obtained in Example 1 was uniformly dissolved in 410 parts by weight of dimethyl sulfoxide, and furthermore, 100 parts by weight of AN, 1 parts by weight of itaconic acid, 0.4 parts by weight of 2,2'-azobisisobutylonitrile as a radical initiator, and 0.1 parts by weight of octyl mercaptan as a chain transfer agent were uniformly dissolved, and the content was put into a reactor equipped with a reflux condenser and a stirring blade. After the space in the reactor was replaced with nitrogen, the content was subjected to the heat treatment of polymerization condition B while being stirred, to obtain a PAN-based polymer solution by being polymerized by a solution polymerization method.

After adjusting the polymer concentration of the obtained PAN-based polymer solution to 18 wt %, by blowing ammonia gas into the solution until the pH became 8.5 to introduce an ammonium group into the polymer, while neutralizing itaconic acid, a spinning solution was prepared. A spinning stabilization-carbonization evaluation were carried out in the same way as Example 1 except changing the spinning solution. Both of fiber producing process stabilization-carbonization process were good in processability, and grades of the obtained precursor fiber and the carbon fiber were good.

Example 4

100 parts by weight of AN, 0.01 parts by weight of AIBN, 0.02 parts by weight of 2,2'-azobis-2,4-dimethyl valeronitrile, and 0.02 parts by weight of 1,1'-azobis(cyclohexane-1-carbonitrile) as radical initiators were uniformly dissolved in 370 parts by weight of dimethyl sulfoxide, and were put into a reactor equipped with a reflux condenser and a stirring blade. After the space in the reactor is replaced with nitrogen, a heat treatment was carried out in the following described condition, while the content being stirred, to obtain a PAN-based polymer solution A by being polymerized by a solution polymerization method.

(1) Heating from 30° C. to 55° C. (heating speed 25° C./hour)
(2) Maintaining at a temperature of 55° C. for 1 hour
(3) Heating from 55° C. to 90° C. (heating speed 2.5° C./hour)

The obtained PAN-based polymer solution A was taken by approximately 10 g, poured into water to precipitate the polymer, and after it was washed with hot water of 95° C. for 2 hours, dried at a temperature of 70° C. for 4 hours, to obtain a dried polymer C. The Mz, Mw and Mn of the obtained dried polymer C were, 4,700,000, 2,500,000 and 1,000,000, respectively.

On the other hand, separately, 100 parts by weight of AN, 1 parts by weight of itaconic acid, 0.4 parts by weight of AIBN as a radical initiator and 0.1 parts by weight of octyl mercaptan as a chain transfer agent were uniformly dissolved in 370 parts by weight of dimethyl sulfoxide, and the content was put into a reactor equipped with a reflux condenser and a stirring blade. After the space in the reactor was replaced with nitrogen, a heat treatment of the above-mentioned polymerization condition B was carried out while the content being stirred, to obtain a PAN-based polymer solution B by being polymerized by a solution polymerization method.

The PAN-based polymer solution A and the PAN-based polymer solution B were mixed such that a weight ratio of the pure polymer components would be 8:92, and adjusted to a polymer concentration of 20 wt %, and by blowing ammonia gas into the mixed solution until the pH became 8.5, to introduce an ammonium group into the polymer while neutralizing the itaconic acid, a spinning solution was prepared. A spinning stabilization-carbonization evaluation were carried out in the same way as Example 1, except changing the spinning solution. Both of the fiber producing process stabilization-carbonization process were good in processability, and grades of the obtained precursor fiber and the carbon fiber were good.

Furthermore, an evaluation of the carbon fiber bundle obtained in the following producing condition was carried out. A coagulated yarn was obtained in a condition of the linear extrusion rate of 7 m/min and a draft ratio at spinning of 3. Thus obtained coagulated yarn was washed with water, and then drawn at a drawing-in-bath ratio of 3 times in a hot water of 90° C., and furthermore, imparted with an amino-modified silicone-based silicone oil agent to obtain a drawn-in-bath yarn. Thus obtained drawn-in-bath yarn was dried for 30 seconds by using a roller heated to a temperature of 165° C., and 2 yarns were joined together to make the total number of filaments into 12,000, and then subjected to a pressurized steam drawing in a condition of steam draw ratio of 5 times to obtain a precursor fiber of carbon fiber of which single fiber thickness was 0.8 dtex, and number of filaments was 12,000. The obtained precursor fiber of carbon fiber was subjected to a stabilization treatment for 90 minutes while being drawn at a draw ratio of 1.0 in the air having a temperature distribution of a temperature of 240 to 260° C., to obtain a stabilized fiber. Successively, the obtained stabilized fiber was subjected to a pre-carbonization treatment in nitrogen atmosphere having a temperature distribution of a temperature of 300 to 700° C. while being drawn at a draw ratio of 1.0, and furthermore, it is subjected to a carbonization treatment in nitrogen atmosphere at a maximum temperature of 1500° C., in which the draw ratio was set to 0.97, to obtain a continuous carbon fiber. When the physical properties of strand of the obtained carbon fiber bundle were measured, it was found that the strength was 5.0 GPa and the modulus was 300 GPa.

Example 5

5 parts by weight of the dried polymer A obtained in Example 1 was uniformly dissolved in 370 parts by weight of dimethyl sulfoxide, and furthermore, 100 parts by weight of AN, 1 parts by weight of itaconic acid, 0.4 parts by weight of 2,2'-azobisisobutylonitrile as a radical initiator, and 0.4 parts by weight of octyl mercaptan as a chain transfer agent were uniformly dissolved, and the content was put in a reactor equipped with a reflux condenser and a stirring blade. After the space in the reactor was replaced with nitrogen, the content was subjected to the heat treatment of the polymerization condition B while being stirred, to obtain a PAN-based polymer solution by being polymerized by a solution polymerization method.

After adjusting the polymer concentration of the obtained PAN-based polymer solution to 22 wt %, by blowing ammonia gas into the solution until the pH became 8.5 to introduce an ammonium group into the polymer, while neutralizing itaconic acid, a spinning solution was prepared. A spinning stabilization-carbonization evaluation were carried out in the same way as Example 1 except changing the spinning solution. Both of fiber producing process stabilization-carbonization process were good in processability, and grades of the obtained precursor fiber of carbon fiber and the carbon fiber were good.

Example 6

The PAN-based polymer solution B obtained in Example 4 was sufficiently washed with water, and dried to obtain a dried polymer B. 53 parts by weight of the PAN-based polymer solution A obtained in Example 4 was mixed with 325 parts by weight of dimethyl sulfoxide and dissolved at a temperature of 70° C. for 6 hours while being stirred, and after adjusting the polymer concentration to the solvent to 2 wt %, 92 parts by weight of the powdered and dried polymer B was mixed in the polymer solution and dissolved at a temperature of 70° C. for 12 hours while being stirred. After adjusting the polymer concentration into 20 wt %, by blowing ammonia gas into the solution until the pH became 8.5 to introduce an ammonium group into the polymer while neutralizing the itaconic acid, a spinning solution was prepared. A spinning stabilization-carbonization evaluation were carried out in the same may as Example 4, except changing the spinning solution. Both of the fiber producing process stabilization-carbonization process were good in processability, and grades of the obtained precursor fiber and the carbon fiber were good. When physical properties of the strand of the obtained carbon fiber bundle were measured in the same way as Example 4, the strength was 6.0 GPa and the modulus was 300 GPa.

Example 7

53 parts by weight of the PAN-based polymer solution A obtained in Example 4 was mixed with 325 parts by weight of dimethyl sulfoxide and dissolved at a temperature of 70° C. for 6 hours while being stirred, and after adjusting the polymer concentration to the solvent to 2 wt %, cooled to 30° C., and in the polymer solution, 100 parts by weight of AN, 1 parts by weight of itaconic acid, 0.4 parts by weight of AIBN as a radical initiator, and 0.1 parts by weight of octyl mercaptan as a chain transfer agent were uniformly dissolved, and the content was put in a reactor equipped with a reflux condenser and a stirring blade. After the space in the reactor was replaced with nitrogen, the content was subjected to the heat treatment of polymerization condition B while being stirred, to obtain a PAN-based polymer solution by being polymerized by a solution polymerization method. After adjusting the polymer concentration into 20 wt %, by blowing ammonia gas into the solution until the pH became 8.5 to introduce an ammonium group into the polymer while neutralizing the itaconic acid, a spinning solution was prepared. When elongational viscosity was measured by using the obtained PAN-based polymer solution, it was found to be $8.7 \times 10^4$ Pa·s, and the ratio of the maximum value to the minimum value was $1.6 \times 10^4$. A spinning stabilization-carbonization evaluation were carried out in the same way as Example 4, except changing the spinning solution. Both of the fiber producing process stabilization-carbonization process were good in processability, and grades of the obtained precursor fiber and the carbon fiber were good. When physical properties of the strand of the obtained carbon fiber bundle were measured in the same way as Example 4, the strength was 6.2 GPa and the modulus was 300 GPa.

Example 8

100 parts by weight of AN, 0.01 parts by weight of AIBN as a radical initiator, and 200 parts by weight of dimethyl sulfoxide were mixed, and the mixture was put into a reactor equipped with a reflux condenser and a stirring blade. After the space in the reactor was replaced with nitrogen; a heat treatment was carried out in the following described condition, while the content being stirred, to obtain a PAN-based polymer solution by being polymerized by a solution polymerization method.

(1) Heating from 30° C. to 70° C. (heating speed 120° C./hour)
(2) Maintaining at a temperature of 70° C. for 40 minutes
(3) Cooling from 70° C. to 30° C. (cooling speed 120° C./hour)

The obtained PAN-based polymer solution which was treated in the same way as the obtained PAN-based polymer solution was taken by approximately 10 g, poured into water to precipitate the polymer, and after it was washed with hot water of 95° C. for 2 hours, dried at a temperature of 70° C. for 4 hours, to obtain a dried polymer C. The Mz, Mw and Mn of the obtained dried polymer C were, 5,800,000, 3,400,000 and 1,400,000, respectively.

The polymer concentration of the obtained PAN-based polymer solution to the solvent was 1.5 wt %. At this time, to polymerize unreacted AN remained in the obtained PAN-based polymer solution, in the polymer solution, 170 parts by weight of dimethyl sulfoxide, 1 parts by weight of itaconic acid, 0.4 parts by weight of AIBN as a radical initiator, 0.1 parts by weight of octyl mercaptan as a chain transfer agent were uniformly dissolved, and the solution was put into a reactor equipped with a reflux condenser and a stirring blade. After the space in the reactor was replaced with nitrogen, a heat treatment of the above-mentioned polymerization condition B was carried out while the content being stirred, and a PAN-based polymer solution was obtained by being polymerized by a solution polymerization method. After adjusting the polymer concentration to 20 wt %, by blowing ammonia gas into the solution until the pH became 8.5 to introduce an ammonium group into the polymer while neutralizing the itaconic acid, a spinning solution was prepared. A spinning stabilization-carbonization evaluation were carried out in the same way as Example 1, except changing the spinning solution. Both of the fiber producing process stabilization-carbonization process were good in processability, and grades of the obtained precursor fiber and the carbon fiber were good. The obtained PAN-based polymer powder was sufficiently washed with water, and dried to obtain a dried polymer A. The Mz, Mw and Mn of the obtained dried polymer A were, respectively, 5,800,000, 3,400,000 and 1,400,000.

When physical properties of the strand of the obtained carbon fiber bundle were measured, it was found that the strength was 8.2 GPa and the modulus was 325 GPa.

Comparative Example 1

100 parts by weight of AN, 1 parts by weight of itaconic acid, 0.4 parts by weight of AIBN as a radical initiator, and 0.1 parts by weight of octyl mercaptan as a chain transfer agent were uniformly dissolved in 370 parts by weight of dimethyl sulfoxide, and the solution was put into a reactor equipped with a reflux condenser and a stirring blade. After the space in the reactor was replaced with nitrogen, a heat treatment of the polymerization condition B was carried out while the content being stirred, and a PAN-based polymer solution was obtained by being polymerized by a solution polymerization method. After adjusting the polymer concentration of the obtained PAN-based polymer solution to 20 wt %, by blowing ammonia gas into the solution until the pH became 8.5 to introduce an ammonium group into the polymer while neutralizing the itaconic acid, a spinning solution was prepared. When the elongational viscosity was measured by using the obtained PAN-based polymer solution, it was found to be $7.3 \times 10^2$ Pa·s, and the ratio of the maximum value to the minimum value was $1.0 \times 10^2$. When the storage modulus was measured by dynamic viscoelasticity using the obtained PAN-based polymer solution, it was found that the storage modulus was 979 Pa at a frequency of 50 rad/s and the storage modulus was 0.44Pa at a frequency of 0.05 rad/s, and the ratio was 2240. When the shear viscosity was measured by a cone-plate viscometer, it was found that the shear viscosity was 53 Pa·s at a shear rate of 20 $s^{-1}$, and the shear viscosity was 0.55 at a shear rate of 2,000 $s^{-1}$, and the ratio was 96. The critical draft ratio at spinning and the critical steam draw ratio were measured in the same way as Example 1, except changing the spinning solution. However, the critical draft ratio at spinning was low, and in the same condition as Example 1, it did not pass the fiber producing process. Therefore, by setting the draft ratio at spinning to 4, without joining the yarns together with the total number of filaments kept in 6,000, a pressurized steam drawing was carried out at a steam draw ratio condition of 5 times, to obtain a precursor fiber of carbon fiber of a single fiber thickness 0.7 dtex and a number of filaments of 6,000. The grade of the obtained precursor fiber of carbon fiber was poor and the processability in fiber producing process was unstable. When the obtained precursor fiber of carbon fiber was subjected to stabilization-carbonization in the same way as Example 1 to obtain a carbon fiber, many fuzzes were generated and yarn breakages occurred in the stabilization-carbonization process.

Comparative Example 2

100 parts by weight of AN, 1 parts by weight of itaconic acid and 0.2 parts by weight of AIBN as a radical initiator were uniformly dissolved in 460 parts by weight of dimethyl sulfoxide, and the solution was put into a reactor equipped with a reflux condenser and a stirring blade. After the space in the reactor was replaced with nitrogen, a heat treatment of the polymerization condition B was carried out while the content being stirred, and a PAN-based polymer solution was obtained by being polymerized by a solution polymerization method. After adjusting the polymer concentration of the obtained PAN-based polymer solution to 15 wt %, by blowing ammonia gas into the solution until the pH became 8.5 to introduce an ammonium group into the polymer while neutralizing the itaconic acid, a spinning solution was prepared. A spinning stabilization-carbonization were carried out in the same way as Comparative Example 1, except changing the spinning solution, but in both of fiber producing process stabilization-carbonization process, many fuzzes were generated.

Comparative Example 3

98 parts by weight of AN, 2 parts by weight of methacrylic acid and 2 parts by weight of AIBN as a radical initiator were uniformly dissolved in 150 parts by weight of dimethyl formamide and 150 parts by weight of water and put into a reactor equipped with a reflux condenser and a stirring blade. After the space in the reactor was replaced with nitrogen, a heat treatment of the following described condition was carried out while the content being stirred, and a PAN-based polymer was obtained by being polymerized by a suspension polymerization method.
(1) Heating from 30° C. to 55° C. (heating speed 10° C./hour)
(2) Maintaining at a temperature of 55° C. for 15 minutes
(3) Adding 333 parts by weight of water
(4) Maintaining at a temperature of 55° C. for 70 minutes
After the obtained PAN-based polymer powder was sufficiently washed with water and dried and dissolved in dimethyl sulfoxide such that the polymer concentration was 15 wt %, ammonia gas was blown into the solution until the pH became 8.5, to prepare a spinning solution. A spinning stabilization-carbonization were carried out in the same way as Comparative Example 1 except changing the spinning solution, but many fuzzes were generated in both of the fiber producing process stabilization-carbonization process.

Comparative Example 4

100 parts by weight of AN, 0.2 parts by weight of 2,2'-azobis-2,4-dimethyl valeronitrile as a radical initiator and 1.5 parts by weight of partially saponified polyvinyl alcohol (degree of polymerization 2000) were uniformly dissolved in 300 parts by weight of water, and put into a reactor equipped with a reflux condenser and a stirring blade. After the space in the reactor was replaced with nitrogen, a heat treatment was carried out in the following described condition while the content being stirred, to obtain a PAN-based polymer by being polymerized by a suspension polymerization method.

(1) Heating from 30° C. to 55° C. (heating speed 10° C./hour)

(2) Maintaining at a temperature of 55° C. for 6 hours

After the obtained PAN-based polymer powder was sufficiently washed with water and dried and dissolved in dimethyl sulfoxide such that the polymer concentration was 5 wt %, to prepare a spinning solution. A spinning was carried out in the sane way as Comparative Example 1 except changing the spinning solution. However, the critical draft ratio at spinning was low and it could not pass the fiber producing process.

Comparative Example 5

100 parts by weight of AN, 1 parts by weight of itaconic acid, 0.4 parts by weight of I AIBN as a radical initiator and 0.5 parts by weight of octyl mercaptan as a chain transfer agent were uniformly dissolved in 370 parts by weight of dimethyl sulfoxide, and put into a reactor equipped with a reflux condenser and a stirring blade. After the space in the reactor was replaced with nitrogen, a heat treatment of the above-mentioned polymerization condition B was carried out while the content being stirred, to obtain a PAN-based polymer solution by being polymerized by a solution polymerization method. The obtained PAN-based polymer solution was taken by approximately 10 g, poured into water to precipitate the polymer, and after it was washed with hot water of 95° C. for 2 hours, dried at a temperature of 70° C. for 4 hours, to obtain a dried polymer D. The Mz, Mw and Mn of the obtained dried polymer D were 130,000, 70,000 and 30,000, respectively. The obtained PAN-based polymer solution and the PAN-based polymer solution obtained in Comparative Example 2 were mixed in a ratio of 6:4 in weight ratio, and after adjusting to the polymer concentration to 20 wt %, ammonia gas was blown into the solution until the pH became 8.5, to introduce an ammonium group into the polymer while neutralizing the itaconic acid, and a spinning solution was prepared. A spinning was carried out in the same way as Comparative Example 1, except changing the spinning solution. However, the critical draft ratio at spinning was low and it could not pass the fiber producing process.

Comparative Example 6

Using the same spinning solution as that of Comparative Example 1, a continuous carbon fiber was obtained in the same way as Example 4, except setting, in the carbonization treatment, the draw ratio to 0.975 and the tension to 6.2 mN/dtex-precursor fiber. At this time, since many fuzzes were generated in the stabilization-carbonization process, only a production of very short time was possible.

Comparative Example 7

The carbon fiber subjected to the carbonization treatment in Comparative Example 6 was further subjected to the second carbonization treatment by setting the tension to 6.2 mN/dtex-precursor fiber in nitrogen atmosphere of maximum temperature of 1850° C., to obtain a continuous carbon fiber.

Comparative Example 8

The carbon fiber subjected to the carbonization treatment in Comparative Example 6 was further subjected to the second carbonization treatment by setting the tension to 6.2 mN/dtex-precursor fiber in nitrogen atmosphere of maximum temperature 1950° C., to obtain a continuous carbon fiber. Furthermore, it is subjected to the third carbonization treatment by setting a draw ratio to 1.01 in nitrogen atmosphere of maximum, temperature 2050° C.

Comparative Example 9

The carbon fiber subjected to the carbonization treatment in Comparative Example 6 was further subjected to the second carbonization treatment by setting a tension to 6.2 mN/dtex-precursor fiber in nitrogen atmosphere of maximum temperature 1950° C., to obtain a continuous carbon fiber. Furthermore, it is subjected to the third carbonization treatment by setting a draw ratio to 1.01 in nitrogen atmosphere of maximum temperature 2250° C.

Example 9

100 parts by weight of AN, 1 parts by weight of itaconic acid and 130 parts by weight of dimethyl sulfoxide were mixed, and put into a reactor equipped with a reflux condenser and a stirring blade. After the space in the reactor was replaced with nitrogen up to an oxygen concentration of 1,000 ppm, 0.002 parts by weight of AIBN was added as a polymerization initiator and a heat treatment was carried out in the following described condition (referred to as polymerization condition E), while the content being stirred.

(1) Maintaining at a temperature of 70° C. for 1.5 hours (2) Cooling from 70° C. to 30° C. (cooling speed 120° C./hour)

Next, to the reactor, 240 parts by weight of dimethyl sulfoxide, 0.4 parts by weight of AIBN as the polymerization initiator and 0.1 parts by weight of octyl mercaptan as a chain transfer agent were weighed and added, and furthermore, a heat treatment of the above-mentioned polymerization condition B was carried out while the content being stirred, to polymerize the residual unreacted monomer by a solution polymerization method, and a PAN-based polymer solution was obtained. A spinning was carried out in the same way as Comparative Example 1, except changing the spinning solution.

Example 10

A PAN-based polymer solution was obtained by polymerizing in the same way as Example 9, except changing the maintaining time of polymerization condition E to 2 hours. A spinning was carried out in the same way as Comparative Example 1, except changing the spinning solution.

Example 11

A PAN-based polymer solution was obtained by polymerizing in the same way as Example 9, except changing the maintaining time of polymerization condition E to 3 hours. A spinning was carried out in the same way as Comparative Example 1, except changing the spinning solution.

Example 12

A PAN-based polymer solution was obtained by polymerizing in the same way as Example 9, except changing the maintaining time of polymerization condition E to 4 hours. A spinning was carried out in the same way as Comparative Example 1, except changing the spinning solution.

Example 13

A PAN-based polymer solution was obtained by polymerizing in the same way as Example 9, except replacing the space of the reactor with nitrogen up to an oxygen concentration of 100 ppm or less and the maintaining temperature of the polymerization condition E was set to 65° C. A spinning was carried out in the same way as Comparative Example 1, except changing the spinning solution.

Example 14

A PAN-based polymer solution was obtained by polymerizing in the same way as Example 13, except changing the maintaining time of polymerization condition E to 2 hours. A spinning was carried out in the same way as Comparative Example 1, except changing the spinning solution.

Example 15

100 parts by weight of AN, 0.3 parts by weight of itaconic acid, 0.003 parts by weight of octyl mercaptan as a chain transfer agent, and dimethyl sulfoxide 360 parts by weight were mixed and put into a reactor equipped with a reflux condenser and a stirring blade. After the space in the reactor was replaced with nitrogen up to an oxygen concentration of 100 ppm, 0.003 parts by weight of AIBN was added as a polymerization initiator and a heat treatment was carried out in the following described condition (referred to as polymerization condition F), while the content being stirred.
(1) Maintaining at a temperature at 60° C. for 3.5 hours Next, to the reactor, 0.7 parts by weight of itaconic acid, 1.0 parts by weight of dimethyl sulfoxide, 0.4 parts by weight of AIBN as a polymerization initiator and 0.1 parts by weight of octyl mercaptan a chain transfer agent were weighed and introduced, and furthermore, a heat treatment of the following described polymerization condition was carried out while the content being stirred, to polymerize the residual unreacted monomer by a solution polymerization method, and a PAN-based polymer solution was obtained.
(2) Maintaining at a temperature of 60° C. for 4 hours
(3) Heating from 60° C. to 80° C. (heating speed 10° C./hour)
(4) Maintaining at a temperature of 80° C. for 6 hours
A spinning was carried out in the same way as Comparative Example 1, except changing the spinning solution.

Example 16

A PAN-based polymer solution was obtained by polymerizing in the same way as Example 15, except changing the octyl mercaptan weighed and introduced at the first time to 0.01 parts by weight. A spinning was carried out in the same way as Comparative Example 1, except changing the spinning solution.

Example 17

A PAN-based polymer solution was obtained by polymerizing in the same way as Example 15, except changing the octyl mercaptan weighed and introduced at the first time to 0.03 parts by weight and the maintaining time of the polymerization condition F to 6 hours. A spinning was carried out in the same way as Comparative Example 1, except changing the spinning solution.

Example 18

A continuous carbon fiber was obtained in the same way as Example 8, except changing, in the carbonization treatment, the draw ratio to 1.01, and the tension to 11.5 mN/dtex-precursor fiber. When the obtained carbon fiber was evaluated, it was found that the strength was 8.2 GPa, modulus was 370 GPa, compressive strength was 1.9 GPa, crystallite size was 2.1 nm and the spin density of localized electron was $1.9 \times 10^{18}$ spins/g. After passing the first carbonization treatment, successively carrying out the second carbonization treatment by setting the tension to 11.5 mN/dtex-precursor fiber in nitrogen atmosphere of the maximum temperature of 1850° C., to obtain a continuous carbon fiber.

Example 19

A carbon fiber was obtained in the same way as Example 18, except setting the second carbonization treatment in nitrogen atmosphere of the maximum temperature of 1950° C., and furthermore, carrying out the third carbonization treatment in nitrogen atmosphere of the maximum temperature of 2050° C. by setting a draw ratio to 1.01.

Example 20

A carbon fiber was obtained in the same way as Comparative Example 7 (that is, a spinning was carried out in the same way as Example 4 and a stabilization-carbonization were carried out in the same way as Comparative Example 6, and furthermore, the second carbonization treatment was carried out in nitrogen atmosphere of the maximum temperature of 1850° C. by setting a tension to 6.2 mN/dtex-precursor fiber), except using the spinning solution of Example 9.

Example 21

A carbon fiber was obtained in the same way as Comparative Example 7 except using the spinning solution of Example 10. When the obtained carbon fiber was evaluated, it was found that the strength was 7.0 GPa, modulus was 335 GPa, compressive strength was 1.7 GPa, crystallite size was 2.1 nm and the spin density of localized electron was $2.6 \times 10^{18}$ spins/g. After passing the first carbonization treatment, successively carrying out the second carbonization treatment by setting a tension to 6.2 mN/dtex-precursor fiber in nitrogen atmosphere of the maximum temperature of 1850° C., to obtain a continuous carbon fiber.

Example 22

A carbon fiber was obtained in the same way as Example 21, except setting the second carbonization treatment in nitrogen atmosphere of the maximum temperature of 1950° C., and furthermore, carrying out the third carbonization treatment in nitrogen atmosphere of the maximum temperature of 2050° C. by setting a draw ratio to 1.01.

Example 23

A carbon fiber was obtained in the same way as Example 21, except setting the second carbonization treatment in nitrogen atmosphere of the maximum temperature of 1950° C., and furthermore, carrying out the third carbonization treatment in nitrogen atmosphere of the maximum temperature of 2250° C. by setting a draw ratio to 1.01.

Example 24

A carbon fiber was obtained in the same way as Example 20, except using the spinning solution of Example 11, and setting tensions of carbonization of the first and second times to 6.2 mN/dtex-precursor fiber.

The above-mentioned results are summarized in Table 1 to Table 4.

TABLE 1

| | Polymer provided to spinning solution | | | | | | | Value analyzed by peak splitting | | | | Content (%) of component of $3 \times 10^6$ or more |
| --- | --- | --- | --- | --- | --- | --- | --- | --- | --- | --- | --- | --- |
| | | | | | | | | Peak of low Mw side | | Peak of high Mw side | | |
| | $M_{z+1} \times 10^4$ | $Mz \times 10^4$ | $Mw \times 10^4$ | $Mn \times 10^4$ | $M_{z+1}/Mw$ | $Mz/Mw$ | $Mw/Mn$ | $Mw \times 10^4$ | Area ratio | $Mw \times 10^4$ | Area ratio | |
| Example 1 | 662 | 269 | 48 | 14 | 13.8 | 5.6 | 3.4 | 35 | 97 | 340 | 3 | 1.1 |
| Example 2 | 689 | 211 | 33 | 10 | 20.9 | 6.4 | 3.3 | 23 | 97 | 340 | 3 | 1.0 |
| Example 3 | 715 | 299 | 60 | 15 | 12.0 | 5.0 | 3.9 | 34 | 92 | 340 | 8 | 2.7 |
| Example 4 | 490 | 200 | 52 | 15 | 9.4 | 3.9 | 3.4 | 35 | 92 | 250 | 8 | 2.7 |
| Example 5 | 755 | 313 | 34 | 7 | 22.1 | 9.1 | 4.6 | 18 | 95 | 340 | 5 | 1.7 |
| Example 6 | 490 | 200 | 52 | 15 | 9.4 | 3.9 | 3.4 | 35 | 92 | 250 | 8 | 2.7 |
| Example 7 | 490 | 200 | 52 | 15 | 9.4 | 3.9 | 3.4 | 35 | 92 | 250 | 8 | 2.7 |
| Example 8 | 662 | 269 | 48 | 14 | 13.8 | 5.6 | 3.4 | 35 | 97 | 340 | 3 | 1.1 |
| Comparative example 1 | 104 | 62 | 35 | 14 | 3.0 | 1.8 | 2.5 | Peak splitting impossible | | | | 0.1 |
| Comparative example 2 | 333 | 184 | 74 | 22 | 4.5 | 2.5 | 3.3 | | | | | 0.7 |
| Comparative example 3 | 356 | 184 | 79 | 23 | 4.5 | 2.3 | 3.4 | | | | | 0.9 |
| Comparative example 4 | 588 | 378 | 135 | 30 | 4.4 | 2.8 | 4.5 | | | | | 47.9 |
| Comparative example 5 | 211 | 113 | 39 | 5 | 5.4 | 2.9 | 7.2 | 7 | 60 | 70 | 40 | 0.3 |
| Example 9 | 364 | 109 | 32 | 13 | 11.3 | 3.4 | 2.5 | 35 | 98 | 340 | 2 | 1.0 |
| Example 10 | 417 | 146 | 37 | 13 | 11.4 | 4.0 | 2.9 | 35 | 97 | 330 | 3 | 1.4 |
| Example 11 | 523 | 211 | 43 | 13 | 12.1 | 4.9 | 3.2 | 35 | 96 | 320 | 4 | 2.3 |
| Example 12 | 569 | 300 | 56 | 13 | 10.1 | 5.3 | 4.2 | 35 | 91 | 310 | 9 | 3.5 |
| Example 13 | 532 | 148 | 37 | 16 | 14.4 | 4.0 | 2.3 | 35 | 98 | 470 | 2 | 1.0 |
| Example 14 | 807 | 274 | 48 | 17 | 16.8 | 5.7 | 2.8 | 35 | 98 | 540 | 2 | 2.1 |
| Example 15 | 436 | 156 | 46 | 18 | 9.8 | 3.4 | 2.6 | 35 | 97 | 300 | 3 | 1.7 |
| Example 16 | 331 | 131 | 45 | 18 | 7.4 | 2.9 | 2.5 | 35 | 97 | 150 | 3 | 1.3 |
| Example 17 | 457 | 144 | 39 | 14 | 11.7 | 3.7 | 2.8 | 35 | 95 | 140 | 5 | 1.3 |

TABLE 2

| | Rz (nm) | Rw (nm) | Rz/RW | $Mz \times 10^4$ (g/mol) | $Mw \times 10^4$ (g/mol) | Mz/Mw |
| --- | --- | --- | --- | --- | --- | --- |
| Example 14 | 29 | 20 | 1.5 | 44 | 12 | 3.8 |
| Example 15 | 37 | 23 | 1.6 | 69 | 15 | 4.7 |
| Example 16 | 36 | 23 | 1.6 | 63 | 13 | 4.7 |
| Comparative example 1 | 30 | 28 | 1.1 | 30 | 13 | 2.3 |

TABLE 3

| | Critical draft ratio at spinning | Critical draw ratio after coagulation | Quality grade of precursor fiber | Quality grade of carbon fiber |
| --- | --- | --- | --- | --- |
| Example 1 | 52 | 25 | 1 | 1 |
| Example 2 | 60 | 20 | 1 | 1 |
| Example 3 | 45 | 29 | 1 | 1 |
| Example 4 | 35 | 34 | 1 | 1 |
| Example 5 | 47 | 32 | 1 | 1 |
| Example 6 | 42 | 35 | 1 | 1 |
| Example 7 | 43 | 35 | 1 | 1 |
| Example 8 | 55 | 26 | 1 | 1 |
| Comparative example 1 | 4 | 35 | 3 | 3 |
| Comparative example 2 | 6 | 34 | 2 | 2 |
| Comparative example 3 | 6 | 34 | 2 | 2 |
| Comparative example 4 | 2 | — | — | — |
| Comparative example 5 | 2 | — | — | — |
| Example 9 | 38 | 35 | 1 | 1 |
| Example 10 | 68 | 33 | 1 | 1 |
| Example 11 | 66 | 28 | 1 | 1 |
| Example 12 | 40 | 14 | 1 | 1 |
| Example 13 | 87 | 30 | 1 | 1 |
| Example 14 | 67 | 29 | 1 | 1 |
| Example 15 | 77 | 31 | 1 | 1 |

TABLE 3-continued

|  | Critical draft ratio at spinning | Critical draw ratio after coagulation | Quality grade of precursor fiber | Quality grade of carbon fiber |
|---|---|---|---|---|
| Example 16 | 55 | 31 | 1 | 1 |
| Example 17 | 37 | 26 | 1 | 1 |

TABLE 4

|  | Carbonization temperature (°C) | Tension at carbonization (mN/dtex - precursor fiber) | Graphitization temperature (°C) | Draw ratio at graphitization (—) | Crystallite size (nm) | Tensile modulus (GPa) | Tensile strength (GPa) | Compressive strength (GPa) | Spin density of localized electron × $10^{18}$ (spins/g) | Single fiber diameter (μm) | Quality grade of carbon fiber |
|---|---|---|---|---|---|---|---|---|---|---|---|
| Example 18 | 1850 | 11.5 | — | — | 2.6 | 420 | 7.5 | 1.7 | 0.5 | 2.1 | 1 |
| Example 19 | 1950 | 11.5 | 2050 | 1.01 | 3.1 | 470 | 7.2 | 1.6 | 0.5 | 2.1 | 1 |
| Example 20 | 1850 | 6.2 | — | — | 2.6 | 385 | 6.5 | 1.6 | 1.3 | 5.4 | 1 |
| Example 21 | 1850 | 6.2 | — | — | 2.6 | 385 | 6.6 | 1.7 | 0.8 | 5.4 | 1 |
| Example 22 | 1950 | 6.2 | 2050 | 1.01 | 3.1 | 435 | 6.0 | 1.6 | 0.8 | 5.4 | 1 |
| Example 23 | 1950 | 6.2 | 2250 | 1.01 | 3.4 | 470 | 5.6 | 1.6 | 0.7 | 5.4 | 1 |
| Example 24 | 1850 | 6.2 | — | — | 2.6 | 385 | 6.4 | 1.6 | 1.3 | 5.4 | 1 |
| Comparative example 6 | 1500 | 6.2 | — | — | 2.1 | 300 | 6.6 | 1.6 | 5.7 | 5.4 | 3 |
| Comparative example 7 | 1850 | 6.2 | — | — | 2.6 | 340 | 6.0 | 1.4 | 2.7 | 5.4 | 3 |
| Comparative example 8 | 1950 | 6.2 | 2050 | 1.01 | 3.1 | 385 | 5.3 | 1.4 | 2.6 | 5.4 | 3 |
| Comparative example 9 | 1950 | 6.2 | 2250 | 1.01 | 3.4 | 410 | 5.0 | 1.3 | 2.5 | 5.4 | 3 |

INDUSTRIAL APPLICABILITY

By using a PAN-based polymer capable of a high speed spinning, and in addition, a high draft ratio at spinning, it is possible to produce a high grade precursor fiber without spoiling productivity, and by using the obtained precursor fiber, it is possible to stably produce a high grade carbon fiber even in stabilization-carbonization process, and it is useful.

The invention claimed is:

1. A method of producing a carbon fiber precursor fiber comprising subjecting a polyacrylonitrile-based polymer solution comprising a polyacrylonitrile-based polymer satisfying at least one of [a] to [d]:
   [a] a Z-average molecular weight (Mz) determined by gel-permeation chromatograph (GPC) of 800,000 to 6,000,000 and a degree of polydispersity (Mz/Mw) (Mw denotes weight average molecular weight) of 3.0 to 10.0;
   [b] a Z+1-average molecular weight (Mz+1) determined by GPC method of 3,000,000 to 10,000,000 and degree of polydispersity (Mz+1/Mw) of 6.0 to 25.0;
   [c] an Mzm determined by gel-permeation chromatograph multi-angle laserlight scattering photometry (GPC-MALLS) of 400,000 to 1,000,000 and a degree of polydispersity (Mzm/Mwm) of 3.0 to 10.0; and
   [d] a Z-average radius of gyration (Rz) determined by gel-permeation chromatograph-multi-angle laserlight scattering photometry (GPC-MALLS) of 25 to 45 nm and a ratio to weight average radius of gyration (Rz/Rw) of 1.3 to 2.5,
to dry-wet spinning,
wherein i) a degree of polydispersity (Mz/Mw) is 1.1 times or more of a molecular weight distribution (Mw/Mn) (Mn denotes number average molecular weight) in [a] and a degree of polydispersity (Mzm/Mwm) is 1.1 times or more of a molecular weight distribution (Mwm/Mnm) in [c], and ii) component A of the polyacrylonitrile-based polymer has a weight average molecular weight (Mw) of 1,000,000 to 15,000,000 as determined by a GPC method and a component B of the polyacrylonitrile-based polymer has a weight average molecular weight (Mw) of 150,000 to 1,000,000, wherein a weight average molecular weight ratio of the component A to the component B is 2 to 45, and a weight ratio of the component A to the component B is 0.001 to 0.3.

2. The method according to claim 1, wherein a component of the polymer has a weight average molecular weight (Mw) of 3,000,000 or more as determined by a GPC method is present in an amount of 1 to 10% of the polymer.

3. The method according to claim 1, wherein the weight average molecular weight ratio of the component A to the component B is 4 to 45.

4. The method according to claim 1, wherein the polyacrylonitrile-based polymer solution has an elongational viscosity of 10,000 Pa·s or more.

5. The method according to claim 1, wherein the polyacrylonitrile-based polymer solution has a ratio of storage modulus of 5 to 500 at a frequency determined by dynamic viscoelasticity of 50 rad/s to storage modulus at a frequency of 0.05 rad/s.

6. The method according to claim 1, wherein the polyacrylonitrile-based polymer solution has a ratio of viscosity of 10 to 50 at a shear rate measured by cone-plate viscometer of 20 $s^{-1}$ to viscosity at a shear rate of 2,000 $s^{-1}$.

7. The method according to claim 1, wherein a draft ratio at spinning of the polyacrylonitrile-based polymer solution is 12 to 100 times and a total draw ratio after taking up coagulated yarn formed from the polyacrylonitrile-based polymer solution is 10 to 35 times.

8. The method according to claim 1, wherein coagulated yarn formed from the polyacrylonitrile-based polymer solution is taken up at a speed of 50 to 500 m/min and a draw ratio after taking up the coagulated yarn is 10 to 35 times.

* * * * *